United States Patent
Iwami

(10) Patent No.: US 8,139,097 B2
(45) Date of Patent: Mar. 20, 2012

(54) INFORMATION-PROCESSING DEVICE WITH CALLING FUNCTION AND APPLICATION EXECUTION METHOD

(75) Inventor: Yohei Iwami, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 1188 days.

(21) Appl. No.: 11/911,949

(22) PCT Filed: Apr. 7, 2006

(86) PCT No.: PCT/JP2006/307426
§ 371 (c)(1),
(2), (4) Date: Oct. 18, 2007

(87) PCT Pub. No.: WO2006/115012
PCT Pub. Date: Nov. 2, 2006

(65) Prior Publication Data
US 2009/0021574 A1    Jan. 22, 2009

(30) Foreign Application Priority Data
Apr. 20, 2005   (JP) ................................. 2005-122256

(51) Int. Cl.
*H04N 7/14*   (2006.01)
(52) U.S. Cl. .................................. 348/14.04; 348/14.11
(58) Field of Classification Search ............... 348/14.01, 348/14.02, 14.04, 14.08, 14.11; 370/260, 370/261
See application file for complete search history.

(56) References Cited

U.S. PATENT DOCUMENTS
2006/0020991 A1 *  1/2006  Goto ............................. 725/106

FOREIGN PATENT DOCUMENTS
| JP | 6-315052 A | 11/1994 |
| JP | 7-30872 A | 1/1995 |
| JP | 2001-243190 A | 9/2001 |
| JP | 2002-44536 A | 2/2002 |
| JP | 2004-289255 A | 10/2004 |
| WO | WO 03/081878 A1 | 10/2003 |

* cited by examiner

*Primary Examiner* — Brian Ensey
(74) *Attorney, Agent, or Firm* — Birch, Stewart, Kolasch & Birch, LLP

(57) ABSTRACT

A TV 1 with a calling function that simplifies operation of an information-processing device having a channel interface and allows smooth communication includes a communication unit 104, an operation input unit 101 for a channel selecting operation, and a calling program processing unit 109 executing a calling program when a call channel is selected. The calling program can be executed by a very simple operation of channel selection, and any one can easily activate videophone. TV 1 with a calling function includes an on-hold information management unit 106 storing call status information indicating whether a call is in progress or not, and in response to a channel switching request from the call channel to another channel during a call, the call status information stored in the on-hold information management unit 106 is referred to and a process is selected and executed depending on its value.

25 Claims, 22 Drawing Sheets

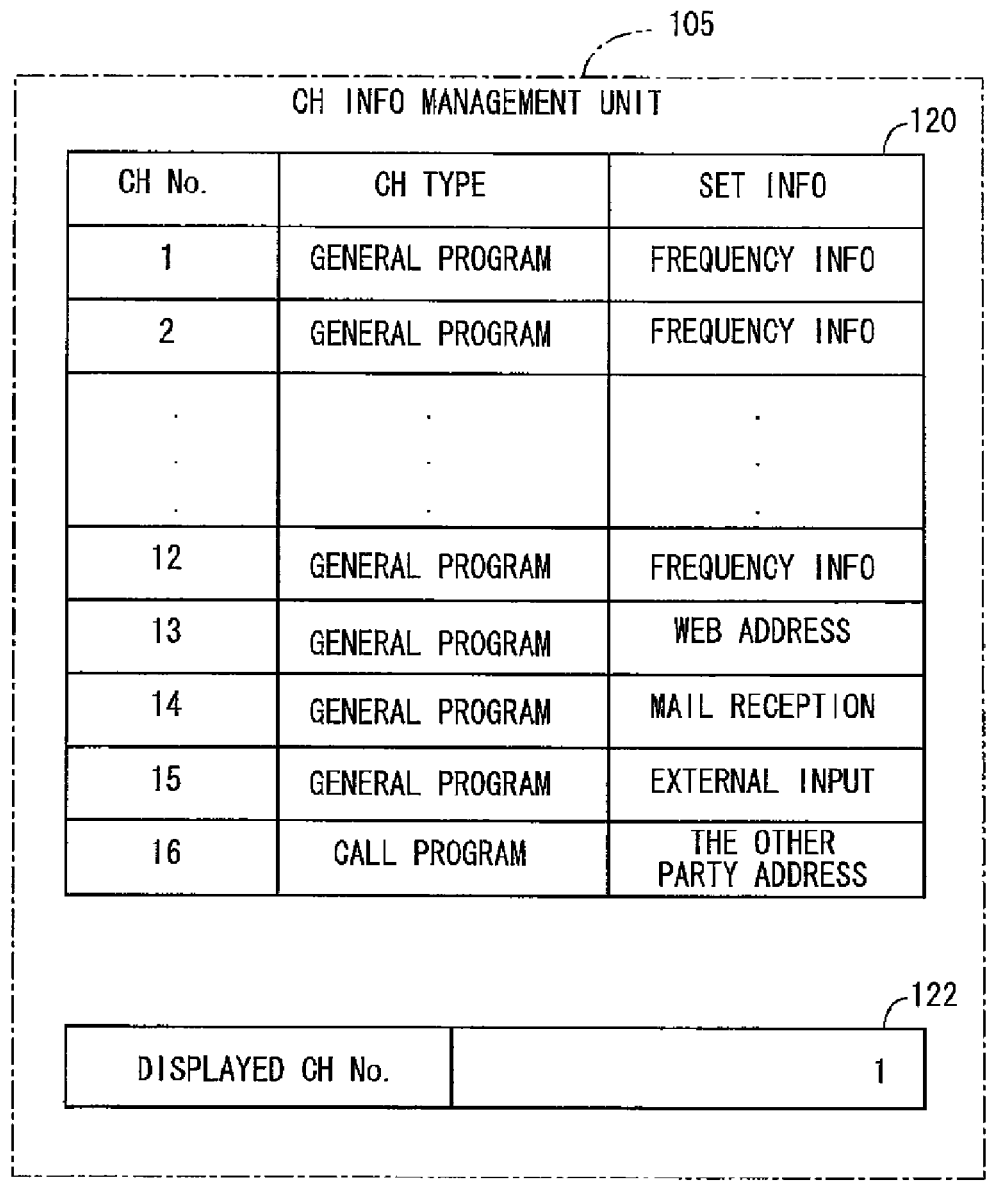

INFORMATION-PROCESSING DEVICE WITH CALLING FUNCTION AND APPLICATION EXECUTION METHOD

TECHNICAL FIELD

The present invention relates to an information-processing device having a channel interface such as a television (hereinafter denoted as "TV") receiver and, more specifically, to an information-processing device with a calling function having a channel interface allowing easy use of applications other than video display of TV broadcast.

BACKGROUND ART

TV has already been a part of people's lives. Along with development in digital communication, functions provided by TV are expected to attain greater sophistication. For instance, digital TV broadcast for portable equipment such as a portable telephone will be introduced in the near future, using a segment of satellite broadcast.

As for the reasons of such popularity of TVs, besides the contents of broadcast, easy operation of TVs should not be ignored. Particularly, broadcast channels are allocated to prescribed frequencies beforehand, and a so-called channel selector for selecting a broadcast channel is provided on the TV. The oldest form of channel selector was a knob-type one that can rotate 30 degrees at a time about the central axis. Turning of the knob allows selection of any one among 12 channels. This operation was so intuitive and very easy to understand that anyone can operate the TV.

Recently, however, not only radio broadcast but also cable broadcast are often viewed by one TV receiver. This means too many channels to be selected by the knob-type selector described above. While a remote controller (a so-called "remote") has been widely used to operate TV from a distance, it is difficult because of space limitations to provide a knob-type channel selector on the remote. This leads to provision of numerical keys on the remote, and the user generally designates a channel using the numerical key.

Still, similarly to the operation of old, knob-type channel selector, when a user switches from one channel to another, the general operation is to move to the "neighboring" channel. Keys for this purpose (up/down keys) are provided on the remote. When one presses the up-key, the channel is switched to an upper one, and when one presses the down-key, the channel is switched to a lower one. The channel returns to the first one after one round. This is similar to the operation of the old, knob-type channel selector, and anyone can easily do this operation.

Patent Document 1: Japanese Patent Laying-Open No. 2002-44536

DISCLOSURE OF THE INVENTION

Problems to be Solved by the Invention

Now, a so-called video-phone is considered to be closely related to a TV. The video-phone has been proposed to enable conversation while viewing an image of the other party of a call, by adding an image display device like a TV and a camera to a telephone that handled voice only.

The video-phone, however, has never been popular. Among various possible reasons of unpopularity, one may be its interface, which is similar to the interface of a voice-only telephone and difficult to use. When using a video-phone, it is necessary to designate telephone number of the party on the other end of the line. Therefore, it is difficult to realize a TV-like simple operation. It may be possible to allocate a party to a button and to establish connection to the party by pressing the button. Even in that case, however, it is necessary to be aware that which button is registered for which party. There may be much psychological burden not to call a wrong number, as the caller is visible to the called party.

Therefore, an information-processing device having an interface that allows use of bi-directional communication means such as the video-phone in a simple manner has been desired.

The present invention was made in view of such problems, and its object is to ease operation of an information-processing device allowing a call with image display like a video-phone as bi-directional communication means, and to realize smooth communication.

Another object of the present invention is to realize easy-to-understand, foolproof operation of a device allowing a call with image display like a video-phone, and to realize smooth communication.

Means to Solve the Problems

According to a first aspect, the present invention provides an information-processing device with a calling function, cooperating with an information output device including a channel selector capable of selecting one of a plurality of channels each serving as a source for providing one or both of image and sound and an output device for outputting one or both of the image and sound from the channel selected by the channel selector, including: a communication device for communicating with other equipment through a communication network; and a calling application executing device for executing a calling application allowing a call with other user by one or both of image and sound, by cooperation with the information output device, through the communication device, when a predetermined first channel is selected by the channel selector.

When the user selects the first channel by operating the channel selector, a calling application is executed. By a very simple operation of channel selection, the calling application can be executed, and hence, anyone can activate the calling application easily.

Preferably, the information-processing device with a calling function further includes a determining device for determining prescribed condition related to execution of the calling application, referred to by the calling application executing device when executing the calling application.

When the calling application is executed, prescribed conditions related to execution of the calling application are determined by the determining device. Dependent on the result of determination, calling applications operable in accordance with various intended purposes may be executed by an easy operation of selecting a channel.

More preferably, the determining device determines whether a call by the calling application is in progress or not. The information-processing device with a calling function further includes a process selector, responsive to an operation requesting channel switching from the first channel to the second channel by the channel selector, for executing one of a predetermined plurality of processes, dependent on a result of determination by the determining device.

If an operation requesting channel switching is made while a calling program is being executed and the calling program is terminated immediately in response, it follows that a call fails abruptly if the operation requesting channel switching should be done erroneously. In such a case, smooth communication cannot be realized. Therefore, when there is an operation requesting channel switching, whether a call by the calling application is in progress or not, that is, busy or not busy is determined, and various processes are done depending on the result of determination. Various processes can be performed on the calling program in accordance with the situation of a call, whereby various measures can be taken to realize a smooth call.

More preferably, the process selector includes a call continuing device for continuing a call by the calling application on the first channel, when the result of determination by the determining device indicates that the call by the calling application is in progress.

If it is determined by the determining device that a call is in progress or busy, by the application, the call is continued even if there is an operation requesting channel switching. Thus, abrupt disruption of a call can be avoided, and a smooth call becomes possible. Further, the operation requesting channel switching may be discarded. Specifically, execution of a program allocated to the second channel may not be started. According to this approach, as long as the call continues, channel is not switched even when the channel switch button of the remote should be operated by mistake, and hence, erroneous operation by the user can be avoided.

The process selector may include a call continuing device for continuing execution of the calling application on the first channel and for starting a program allocated to the second channel, when the determining device determines that the call by the calling application is in progress.

When there is a request for channel switching to the second channel, execution of the calling application is continued, and execution of the program allocated to the second channel is started. The user can confirm the contents of the second channel while continuing the call.

Preferably, the communication device is capable of video communication, and the call continuing device includes a device for continuing an audio call by the calling application while interrupting image communication, and a device for starting image display by a program allocated to the second channel.

When there is a request for channel switching to the second channel, execution of the calling application is continued, and the image display is switched to the image display of the program allocated to the second channel. Thus, it is possible to confirm the contents of the second channel while the voice call is continued.

More preferably, the communication device is capable of video communication, and the call continuing device includes a device for continuing an audio call by the calling application, and a device for presenting image display combining an image of the program allocated to the second channel and an image by the calling application.

When there is a request for channel switching to the second channel, execution of the calling application is continued, and the image display combining the image display of the program allocated to the second channel and the image related to the call is displayed. Thus, it is possible to confirm the contents of the second channel while communication with voice and image is continued.

The information-processing device with a calling function may further include a storage for storing prescribed information related to a calling program, related to execution of the calling application, referred to by the determining device when executing the calling application.

More preferably, the information related to the calling program includes on-hold party information identifying a party of a call when the call by the calling program is kept on-hold.

The process selector includes a device for suspending a call by the calling application of the first channel and starting execution of the application allocated to the second channel, when the result of determination by the determining device indicates that the call by the calling application is in progress, a device responsive to suspension of the call by the calling application for updating the call status information to a value indicating that a call is not in progress, and a device for setting information identifying the other party of the call through the first channel, in the on-hold party information.

When there is an operation requesting channel switching during a call, the call by the calling application is suspended, the call status information is set to "not-busy", and information specifying the party on the other end of the line is set as the on-hold party information. By this process, it is possible not to terminate but to keep the call on-hold, even when the user erroneously makes an operation requesting channel switching.

The information-processing device with a calling function may further include a call resuming device, responsive to an operation requesting channel switching to the first channel by the channel selector and responsive to an indication by the result of determination of the determining means that a call is not in progress, for resuming the call by the calling program to the other party of the call identified by the on-hold party information, using the first channel.

When the call in accordance with the calling application using the first channel is kept on-hold and an operation requesting channel switching to the first channel is done, the call can be resumed. By this arrangement, even if the user is not specifically aware of a special operation of canceling on-hold of the call, the on-hold state can be cancelled by a simple operation similar to the channel selecting operation of a TV.

Preferably, the process selector further includes an on-hold notifying device responsive to suspension of the call by the calling application, for sending an on-hold notifying signal requesting on-hold of a call by the calling application, to the other party of the call of the calling application.

The on-hold notifying signal is sent to the other party of the call. The other party can understand, when the call is suspended, that the suspension is caused by the on-hold operation on this side. The user as the other party would not be left confused, not knowing the cause of suspended call.

More preferably, the information-processing device with a calling function may further include: a timer measuring a constant time period from setting of the on-hold party information; a device, responsive to clearing of the on-hold party information, for resetting the timer; a device, responsive to expiration of time measurement of the constant time period by the timer, for transmitting a disconnection request of the call by the calling application, to the other party of the call indicated by the on-hold party information; and a device for clearing the on-hold party information, based on transmission of the disconnection request.

When the on-hold situation is kept without cancellation for a prescribed time period or longer, a disconnection request is automatically sent to the other party of the call and the call is disconnected. Thus, a situation that the other party is forgotten and kept on-hold endlessly, can be avoided.

More preferably, the information related to the calling program includes on-hold requesting party information identifying a transmission source that transmitted on-hold request requesting on-hold of a call through the communication device, and the information-processing device with a calling function further includes: a call suspending device, responsive to reception of the on-hold request from the other party of the call through the communication device during a call using the calling application on the first channel, for suspending the call by the calling application; a device for storing, in the storage, information identifying the other party of the call that transmitted the on-hold request, as the on-hold requesting party information, based on suspension of the call by the calling application; and a call resuming device, responsive to the communication device receiving a on-hold canceling request, for comparing the transmission source of the on-hold canceling request and the on-hold requesting party information, and for resuming execution of the calling application when they match.

When the on-hold request is received from the other party of the call, the party is set in the on-hold requesting party information. If a request for cancellation is received from the same party, the on-hold status is cancelled. Different from when this side set the on-hold status, the on-hold status can be cancelled immediately in response to the cancellation request from the party, if the on-hold status has been set upon request of on-hold by the party.

The information-processing device with a calling function may further include a device, responsive to resuming of the call by the call resuming device, for clearing the on-hold requesting party information.

When the call is resumed, the on-hold requesting party information is cleared and, therefore, it is possible thereafter to determine that the on-hold status started by the on-hold request from the party has been cancelled.

Preferably the information related to the calling program further includes a device for executing a channel switching process to the first channel without changing the on-hold requesting party information, when an operation requesting channel switching to the first channel is made by the channel selector while the result of determination by the determining device indicates that a call is not in progress and the on-hold requesting party information is not cleared.

The situation that the on-hold state started upon request by the other party and the on-hold status has not been cancelled can be known from the result of determination by the determining device and from the on-hold requesting party information. Even when the user views another channel while the on-hold status continues and then the user returns to the original channel, the channel switching operation is done while such information is kept unchanged. Therefore, the on-hold status can be maintained.

The information-processing device with a calling function may further include the information output device.

According to a second aspect, the present invention provides a computer program causing, when executed by a computer with a communication device, the computer to operate as the information-processing device with a calling function according to the first aspect.

Therefore, by the computer program, the same effects as those attained by the information-processing device with a calling function can be attained.

According to a third aspect, the present invention provides a method of executing an application in an information-processing device with a calling function, cooperating with an information output device including a channel selector capable of selecting one of a plurality of channels each serving as a source for providing one or both of image and sound and an output device for outputting one or both of the image and sound from the channel selected by the channel selector. The information-processing device with a calling function includes a communication device for communicating with other equipment through a communication network, and prescribed applications are allocated to the plurality of channels, respectively. The method of executing the application includes the steps of: detecting the channel selector performing an operation requesting switching to a predetermined first channel; and executing, in response to detection of the operation requesting switching to the first channel, a calling application allowing a call with other user by one or both of image and sound, by cooperation with the information output device, through the communication device.

When the first channel is selected by operating the channel selector, a calling application is executed. By a very simple operation of channel selection, the calling application can be executed, and hence, anyone can activate the calling application easily.

Preferably, the method further includes the first determining step of determining a prescribed condition related to execution of the calling application, when executing the calling application, and the executing step includes the step of activating, in response to detection of the operation requesting switching to the first channel, the calling application with reference to a result of determination of the first determining step.

As the calling application is activated with reference to the result of determination by the first determining step, the calling application can be executed under various conditions. The calling application operable in accordance with various intended purposes may be executed by an easy operation of selecting a channel.

Preferably, the first determining step includes the step of determining, when the calling application is to be executed, whether a call by the calling application is in progress or not. The method further includes the process selecting step, responsive to the channel selector performing an operation requesting channel switching from the first channel to the second channel, of executing one of a predetermined plurality of processes, dependent on a result of determination of call status by the determining step.

If an operation requesting channel switching is done while a calling program is being executed and the calling program is terminated immediately in response, it follows that the call fails abruptly even if the operation requesting channel switching was done erroneously. In such a case, smooth communication cannot be realized. Therefore, when there is an operation requesting channel switching and the calling application is to be executed, whether a call by the calling application is in progress or not, that is, busy or not busy is determined, and various processes are done dependent on the result of determination. Various processes can be performed on the calling program in accordance with the situation of the call, whereby various measures can be taken to realize a smooth call.

Preferably, the process selecting step includes the step of continuing the call by the calling application of the first channel and suspending execution of an application allocated to the second channel, when the result of determination of the determining step indicates that a call by the calling application is in progress.

If it is determined at the determining step that a call by the application is in progress or busy, the call is continued even if there is an operation requesting channel switching. Thus, abrupt disruption of the call can be avoided, and a smooth call becomes possible.

Preferably, the process selecting step includes the step of suspending the call by the calling application on the first channel, when the result of determination of the determining step indicates that a call by the calling application is in progress, and the step of starting an application allocated to the second channel, regardless of the result of determination of the determining step.

When there is an operation requesting channel switching during a call, the call by the calling application is suspended regardless to whether the line is busy or not, and execution of the application allocated to the second channel starts. Suspension of a call and the instruction to start execution of the application allocated to the second channel can be realized by one operation.

More preferably, the information-processing device with a calling function further includes a storage for storing prescribed information related to a calling program related to execution of the calling application. The process selecting step further includes the step of storing, in the storage, information identifying a party of a call by the calling application, in response to suspension of the call by the calling application at the suspending step.

When there is an operation requesting channel switching during a call, the call by the calling application is suspended, and the information specifying the other party of the call is stored in the storage device. By this process, it becomes possible to resume the call by making reference to the information in the storage device, if the operation requesting channel switching should be done erroneously.

Preferably, the method further includes: the second determining step of determining whether a call by the calling application is in progress or not, in response to the channel selector performing the operation requesting channel switching to the first channel; the third step of determining whether the information of the other party of the call is stored in the storage or not, in response to determination at the second determining step that a call is not in progress; and the step of resuming the call with the other party of the call specified by the information of the other party of the call by the calling application using the first channel, in response to the determination at the third step that the information of the other party of the call is stored in the storage.

When there is an operation requesting channel switching during a call, the call by the calling application is suspended, and the information specifying the other party of the call is set in the storage device. By this process, it becomes possible to resume the call by using the information of the other party, if the operation requesting channel switching should be done erroneously.

More preferably, the method further includes the step of clearing information stored in the storage, in response either to resuming of the call by the calling application at the resuming step or to termination of execution of the calling application.

When the call is resumed or when the call ends, the information stored in the storage device is cleared. Because of this process, if it is determined at the second determining step that a call is not in progress or not busy, it is determined at the third determining step that the information of the other party of the call is not stored in the storage device. As a result, the call is not resumed. In other words, erroneous trial to resume the call when it is unnecessary can be avoided.

Preferably, the method further includes: the step of suspending a call by the calling application, in response to reception of an on-hold request from the other party of the call through the communication device during a call using the calling application on the first channel; the step of storing information of the other party of the call that transmitted the on-hold request, based on suspension of the call by the calling application; and the step of comparing, responsive to reception of an on-hold canceling request by the communication device, transmission source of the on-hold canceling request with the information of the other party of the call, and resuming execution of the calling application when they match.

When the on-hold request is received from the other party of the call, call party information specifying the party is stored in the storage device. If a request for cancellation is received from the same party, the on-hold status is cancelled. Different from those cases where this side sets the on-hold status, the on-hold status can be cancelled immediately in response to the cancellation request from the other party, if the on-hold status has been set upon request of on-hold by the other party.

Preferably, the method further includes the step of clearing the information stored in the storage, in response either to resuming of execution of the calling application at the execution resuming step, or to termination of execution of the calling application.

When the call is resumed or when the call ends, the information stored in the storage device is cleared. Because of this process, if it is determined at the second determining step that a call is not in progress or not busy, it is determined at the third determining step that the information of the other party of the call is not stored in the storage device. As a result, the call is not resumed. In other words, erroneous trial to resume call when it is unnecessary can be avoided.

More preferably, the information-processing device with a calling function further includes storage for storing prescribed information related to a calling program related to execution of the calling application, referred to when the a calling application is to be executed. The executing step includes the step of activating the calling application with reference to the program related information, in response to detection of an operation requesting switching to the first channel.

As the calling application is activated with reference to the program-related information, the calling application can be executed under various conditions.

The computer program according to the fourth aspect of the present invention controls the computer such that all the steps of any of the methods described above are executed, when the program is executed on the computer.

Therefore, the computer program attains similar effects as those attained by executing each of the application executing methods described above.

The computer-readable recording medium according to the fifth aspect of the present invention records any of the computer programs described above.

When the computer program recorded on the recording medium is executed by a computer, similar effects as those attained by the information-processing device with a calling function and the method of executing application can be attained.

EFFECTS OF THE INVENTION

As described above, according to the present invention, the calling application can be executed by a very simple operation of channel selection, and anyone can activate the calling application easily. Further, the calling application operable in accordance with various intended purposes can be executed by an easy operation of channel selection.

Even when an operation for requesting channel switching is done while the calling program is being executed, various processes can be done in accordance with the call status. Therefore, various measures can be taken to enable a smooth call. By way of example, if it is possible to determine that a call is in progress by the application, the call is continued even when there is a request for channel switching. Thus, abrupt disconnection of the call can be avoided, and a smooth call is realized. Further, if the execution of calling application is continued and the execution of a program allocated to the second channel is started when there is a request for channel switching to the second channel, it is possible for the user to confirm the contents of the second channel while continuing the call. For instance, the call by the calling application is continued while the image display is switched to the image display in accordance with the program allocated to the second channel. Thus, it is possible to confirm the contents of the second channel while continuing the call. Alternatively, the call by the calling application is continued while the image obtained by combining the image display of the program allocated to the second channel and the image display of calling program is displayed. Thus, the contents of the second channel can be confirmed while communication with voice and image is continued.

When there is an operation requesting channel switching during a call, information of the other party of the call is stored in the storage device. If the operation requesting channel switching is made erroneously, the call can be resumed using the information of the other party. Further, by an operation requesting channel switching to the first channel in the on-hold status, the call can be resumed. Even if the user is not specifically aware of a special operation of canceling on-hold of the call, the on-hold status can be cancelled by a simple operation similar to the channel selecting operation of a TV.

When the on-hold status is set by an operation of channel switching request, the on-hold notice is sent to the other party of the call. The user as the other party would not be left confused, not knowing the cause of call suspension. By automatically disconnecting the call when the on-hold status is kept without cancellation for a prescribed time period or longer, a situation that the other party is forgotten and kept on-hold endlessly, can be avoided.

When an on-hold request is received from the other party of the call, the information of the other party is stored in the storage device. When the on-hold status is set upon request from the other party, the on-hold status is cancelled immediately in response to the cancellation request from the party. By clearing the information of the other party of the call when the call is resumed, it can be determined thereafter that the on-hold status set by the request from the other party has been cancelled. If the user views another channel in the on-hold status and the channel is returned to the original channel, the on-hold status can be continued, as the channel switching process is done without changing such information.

BRIEF DESCRIPTION OF THE DRAWINGS

FIG. 3 schematically shows data format handled by channel information management unit 105 in TV 1 with a calling function shown in FIG. 2.

FIG. 4 schematically shows data format handled by on-hold information management unit 106 in TV 1 with a calling function shown in FIG. 2.

Figure 1:
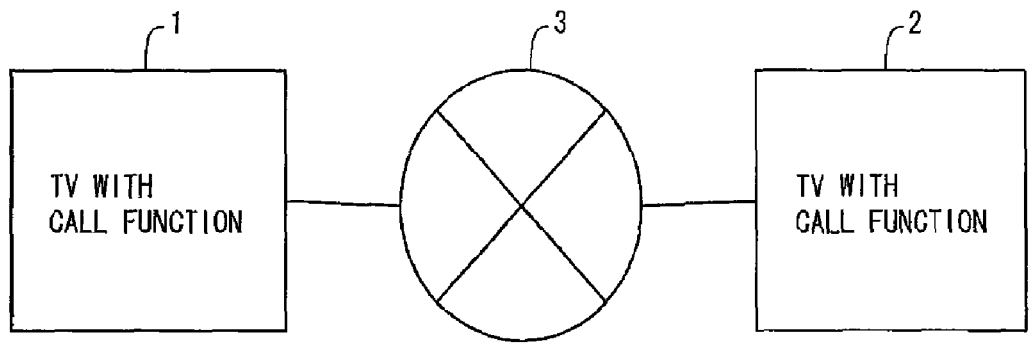
FIG. 1 shows an overall configuration of a system including TVs 1 and 2 with calling functions in accordance with the first embodiment of the present invention.

DESCRIPTION OF REFERENCE CHARACTERS 1,2 TV with calling function, 3 network, 101 operation input unit, 102 broadcast input unit, 103 audio/video input/output unit, 104 communication unit, 105 channel information management unit, 106 on-hold information management unit, 107 call status flag processing unit, 108 general program processing unit, 109 calling program processing unit, 110 on-hold sound/on-hold video generating unit, 111 control unit, 191 TV screen, 192 on-hold image, 200 TV system with calling function, 310 TV function module, 312 calling function module.

BEST MODES FOR CARRYING OUT THE INVENTION

In the following, embodiments of the present invention will be described in detail with reference to the figures. In the following description and figures, the same components are denoted by the same reference characters. They have the same names and functions. Therefore, detailed description thereof will not be repeated.

<Underlying Technique>

Though the direction is different from improvement of video-phone interface, recently, TV receivers displaying general TV broadcast and capable of executing programs other than TV programs have been proposed. By way of example, Patent Document 1 discloses a technique in which applications are mapped to TV channels, and when the channel is changed, the application attains a prescribed operation.

Here, the "channel" includes not only the so-called TV channels for receiving terrestrial wave, satellite wave, digital and analog TV broadcasts or radio broadcast, but also those for displaying outputs from external input devices such as a video tape recorder, a DVD (Digital Versatile Disc) recorder, a hard disk recorder, a set top box, a digital camera and a personal computer. These are generally implemented in the form of an input switching buttons and the like on the TV receiver, to be distinguished from TV channels.

According to the technique described in Patent Document 1, in the TV receiver, in addition to ordinary TV programs, signals from external input device such as a VTR (Video Tape Recorder), electronic mail program or a Web browser program are allocated to channel numbers. By a simple operation similar to channel switching of a TV broadcast, an intended process can be executed.

As to the channel interface described in Patent Document 1, generally accepted TV interface is utilized to allow browsing new media such as electronic mails, Web pages and the like. As a result, even those who are not very familiar with techniques can readily enjoy such media.

It would be convenient if such a channel interface could be used in a device for the call with image display represented by the video-phone, as it allows TV-like simple operation. The concept of combining video-phone and the TV channel interface, however, has not been known. Possible reason for this may be as follows. Video-phone is an extension of conventional telephone, which requires a scheme allowing designation of one arbitrary telephone number among numerous telephone numbers. In contrast, TV requires only a simple scheme of selecting one from a limited number of channels. Namely, the manner of selecting the other side is fundamentally different in TV and video-phone. Conventionally, no one conceived a common interface between the video-phone and TV, unconditionally accepting the difference in interface derived from such difference in the manner of selecting the other side.

Even when such an idea is conceived, there is a huge obstacle in actually implementing such an interface. Specifically, application of the channel interface such as described above to video-phone type communication leads to the following problems.

When the specification similar to the one described above is adopted such that while the calling program is being executed on TV and the calling program is terminated by the channel switching operation as in the method described in Patent Document 1, there arises a problem that the call is disrupted if an erroneous channel switching operation should be done. By the time when the channel is returned to the call channel, the calling program is restarted and connection to the disconnected party is resumed, the other party might no longer be at the end of the line. Further, a smooth call would not be possible if connection fails upon every erroneous operation.

In order to solve this problem, a design may be possible in which the calling program is not terminated even when there is a channel switching operation. For instance, a design may be adopted in which the output is switched to a program display of the changed channel while the call is not terminated but kept in a standby status until the call resumes. In such a case, the user may possibly forget that the calling program is being executed, if he/she should be preoccupied with the program of the newly displayed channel. In such a situation, the user doesn't respond to the conversation with the other party, and the other party would be confused as to why there is no response, as the other party is unaware of the situation on this end of the line.

In order to apply the TV channel interface to the video-phone type interactive communication, such problems must be solved. The inventors considered possible problems that might be experienced in the call device with image display such as video-phone when events particular to TV channel interface and not expected in the video-phone occur, such as in the case of channel switching operation, and the embodiments described below adopt a scheme that can avoid such problems and realize a smooth call.

<First Embodiment>

[Configuration]

In the following, a TV with a calling function that realizes a smooth call will be described, as an example of an information-processing device with a calling function having a channel interface, in accordance with a first embodiment of the present invention. Here, the "TV with a calling function" refers to a TV having TV broadcast and, in addition, programs other than the calling program such as Web browser, and the calling program for a call of video-phone or communication with voice, are mapped to channels. Programs other than the calling program, including programs for generating sound and displaying video images for TV broadcast, electronic mail program, or Web browser program will be referred to as "general programs".

Referring to FIG. 1, generally, such TVs 1, 2 with calling functions are connected through a network 3. Network 3 may be an arbitrary network, such as a telephone network, LAN (Local Area Network), or the Internet. TVs 1 and 2 with a calling function have similar configurations. In the following, only the TV 1 with a calling function will be described.

Figure 2:
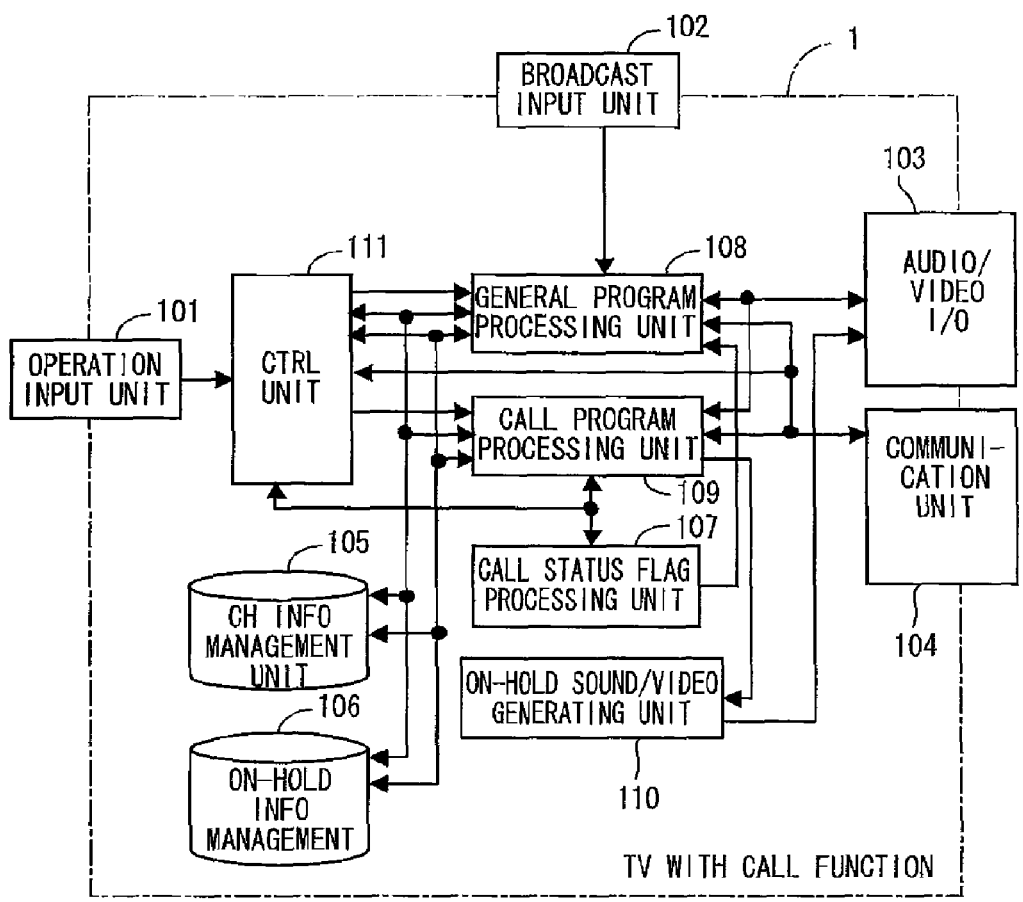
FIG. 2 is a block diagram showing a functional structure of TV 1 with a calling function shown in FIG. 1.

FIG. 2 shows a logical configuration of TV 1 with a calling function. Referring to FIG. 2, TV 1 with a calling function includes: an operation input unit 101 receiving an input signal from a remote (not shown) or a button or a touch panel (both not shown) of TV 1 with a calling function; a broadcast input unit 102 for receiving broadcast of prescribed frequency; an audio/video input/output unit 103 for outputting voice and video images of received broadcast and the like and for inputting/outputting voice and video images when the calling program is executed; a communication unit 104 for communication, realizing a call with another electronic device connected to the communication network; a channel information management unit 105 managing channel mapping information, information for setting a program mapped to the channel of interest (channel setting information), and information related to the channel that is being displayed; an on-hold information management unit 106 for managing information (on-hold related information) related to the other party of communication when the line is on-hold in the calling program; and a call status flag processing unit 107 storing a flag representing a call status by the calling program, and updating the flag value in response to the start and end of the call.

TV 1 with a calling function further includes: a general program processing unit 108 for obtaining, when a channel is changed to a channel other than the channel allocated to the calling program, the channel setting information related to the channel number from channel information management unit 105 and executing a general program such as reception of TV broadcast or execution of a mail program or Web browser program; a calling program processing unit 109 for executing, when a channel is changed to the channel allocated to the calling program, the corresponding communication program; an on-hold sound/on-hold image generating unit 110 for generating an on-hold sound and an on-hold image indicating the on-hold status; and a control unit 111 for controlling various units of TV 1 with a calling function, when an operation such as a channel change is done, by applying a prescribed control signal and associated information to an appropriate processing unit in response to the operation.

Broadcast input unit 102 receives broadcast of the frequency set by general program processing unit 108. A terrestrial wave or satellite analog tuner or digital tuner, a cable TV receiver or the like corresponds to this unit.

Audio/vide input/output nit 103 includes an audio input device, an audio output device, a video input device and a video output device, not shown. The audio input device is, for example, a microphone. The audio output device is, for example, a speaker. The video input device is, for example, a camera. The video output device is an image display device such as an LCD (Liquid Crystal Display).

Communication unit 104 has a function of performing communication with other electronic devices connected to the network such as network 3 (see FIG. 1). Communication unit 104 is normally connected to network 3, and demodulates a signal received from another device on network 3 and outputs the demodulated signal to general program processing unit 108 or calling program processing unit 109, or modulates an input signal from general program processing unit 108 or from calling program processing unit 109 and transmits the modulated signal to another device on network 3.

Channel information management unit 105 stores, in accordance with an instruction from calling program processing unit 109 and general program processing unit 108, the channel number of the channel that is currently being displayed on the video output device of audio/video input/output unit 103. The channel number may be referred to by calling program processing unit 109, general program processing unit 108 and control unit 111.

Figure 5:
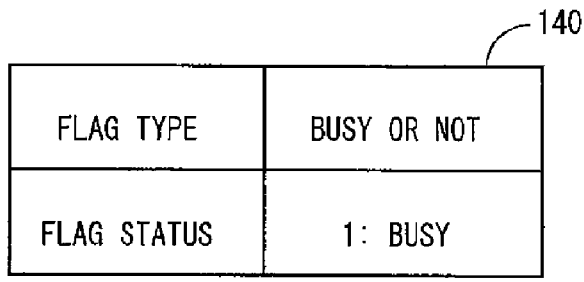
FIG. 5 schematically shows data format handled by call status flag processing unit 107 in TV 1 with a calling function shown in FIG. 2.

FIG. 3 shows exemplary pieces of information stored in channel information management unit 105. Referring to FIG. 5, channel information management unit 105 stores and manages channel mapping information 120 and displayed-channel-number 122 that is being displayed.

Channel mapping information 120 includes a plurality of entries. Each entry includes a channel number, channel type information indicating whether the program related to the channel number of interest is a general program or a calling program, and channel setting information necessary for setting the program corresponding to the channel number of interest.

In the example shown in FIG. 3, channel numbers 1 to 15 are allocated to general programs. Of these, channels 1 to 12 are allocated to reception of TV broadcast. Here, the setting information contains frequency information of the television broadcast. Channel 13 is allocated to Web browser. Here, the setting information contains the Web address to be accessed when the Web browser is activated. Channel No. 14 is allocated to an electronic mail program (hereinafter referred to as a "mailer"). Here, the setting information contains information necessary to receive a mail. Channel No. 15 is allocated to external input 1. Here, the setting information contains information identifying the external input.

Communication program is allocated to channel No. 16. The corresponding setting information contains communication destination address of the other party of the call. The communication destination address is information necessary to identify the other party of communication, such as a sip (Session Initiation Protocol) address or a telephone number.

Displayed-channel-number 122 managed by channel information management unit 105 represents information indicating which channel is being displayed. As this information is stored, when some event occurs, different process can be performed depending on the currently displayed channel, by making reference to displayed-channel-number 122. As will be described later, in the present embodiment, the process performed upon channel switching operation differs, depending on whether the currently displayed channel is allocated to the call channel or the currently displayed channel is allocated to a general program. Displayed-channel-number 122 is updated by general program processing unit 108 or calling program processing unit 109.

Referring to FIG. 4, on-hold related information 130 managed by on-hold information management unit 106 has on-hold party information and on-hold requesting party information. The on-hold party information represents information of the other party when the call is kept on-hold from this side, in accordance with an instruction from calling program processing unit 109. The on-hold requesting party information represents information of the other party when the other party requested on-hold. In the following, a status in which the call is set on-hold from this side will be referred to as "on-hold status", and the status in which the call is set on-hold upon request from the other party will be referred to as "on-hold forced status". Contents of on-hold related information 130 can be referred to by general program processing unit 108 and calling program processing unit 109. These functional units can determine, by making reference to on-hold related information 130, whether the line is in the on-hold status of on-hold forced status, or not in the on-hold or on-hold forced status. From the example shown in FIG. 4, one can see that the call with a party having the address "xxx-yyy-zzz" is being kept on-hold.

Referring to FIG. 5, the call status flag processing unit 107 in accordance with the present embodiment manages a call status flag 140 indicating the call status. Call status flag processing unit 107 sets the flag to a value (in the present embodiment, "1") indicating a busy status when the call with the other party is started by calling program processing unit 109, and sets the flag to a value ("0" in the present embodiment) indicating a non-busy status when the call is on-hold or when the call is terminated. In the present embodiment, the type of flag 140 is simply a flag indicating busy or not. From the example shown in FIG. 5, one can see that a call is in progress currently.

Call status flag 140 may be referred to by control unit 111, general program processing unit 108 and calling program processing unit 109, and these functional units can determine whether the line is busy at present or not by making reference to call status flag 140. In the present embodiment, different process is performed depending on the value of call status flag 140, when the channel switching operation or the like is done. Specifically, the process performed in response to the channel switching operation differs depending on whether the line is busy or not.

General program processing unit 108 has a general function of executing a computer program by a configuration including a CPU (Central Processing Unit) similar to a computer, and when the channel is changed, it obtains the channel setting information from channel information management unit 105 based on the channel No. given by control unit 111 to receive television broadcast, or start the Web browsing program or the electronic mail program through communication unit 104. General program processing unit 108 also outputs one or both of the sound and video input from broadcast input unit 102 or communication unit 104 through audio/video input/output unit 103. General program processing unit further has a function of terminating the program in response to a termination instruction from control unit 111.

Calling program processing unit 109 has a function of executing a calling program by a configuration including a CPU similar to a computer, and has a function of changing the process to be executed depending on the value of call status flag 140 stored in call status flag processing unit 107. Specifically, calling program processing unit 109 realizes a call with a party whose information is set corresponding to the channel number applied from control unit 111 through communication unit 104, or puts the call on-hold in accordance with information stored in call status flag processing unit 107 or on-hold information management unit 106.

Such a computer program is stored in a hard disk or a non-volatile memory, not shown, called to be resident in a memory when the power is turned on, and executed as needed. The functions of general program processing unit 108 and calling program processing unit 109 may be realized by one CPU, or by a plurality of CPUs. In the present embodiment, these functions are realized by one CPU.

On-hold sound/on-hold video generating unit 110 generates either one or both of on-hold sound and on-hold video in response to application of an instruction to generate the on-hold sound and the on-hold video from the calling program executed by calling program processing unit 109, and outputs the same from audio/video input/output unit 103.

Control unit 111 transmits the operation input from operation input unit 101 to functional blocks such as calling program processing unit 109 and general program processing unit 108, and when there is a channel switching operation, it activates a program allocated to the channel number as changed, by making reference to channel information management unit 105.

(Program Configuration)

TV 1 with a calling function described above can be realized by a computer including a tuner, an image display device and a speaker, and a computer program that runs on the computer. In the following, the configuration of computer program for actual implementation will be described.

Overall Routine

Figure 6:
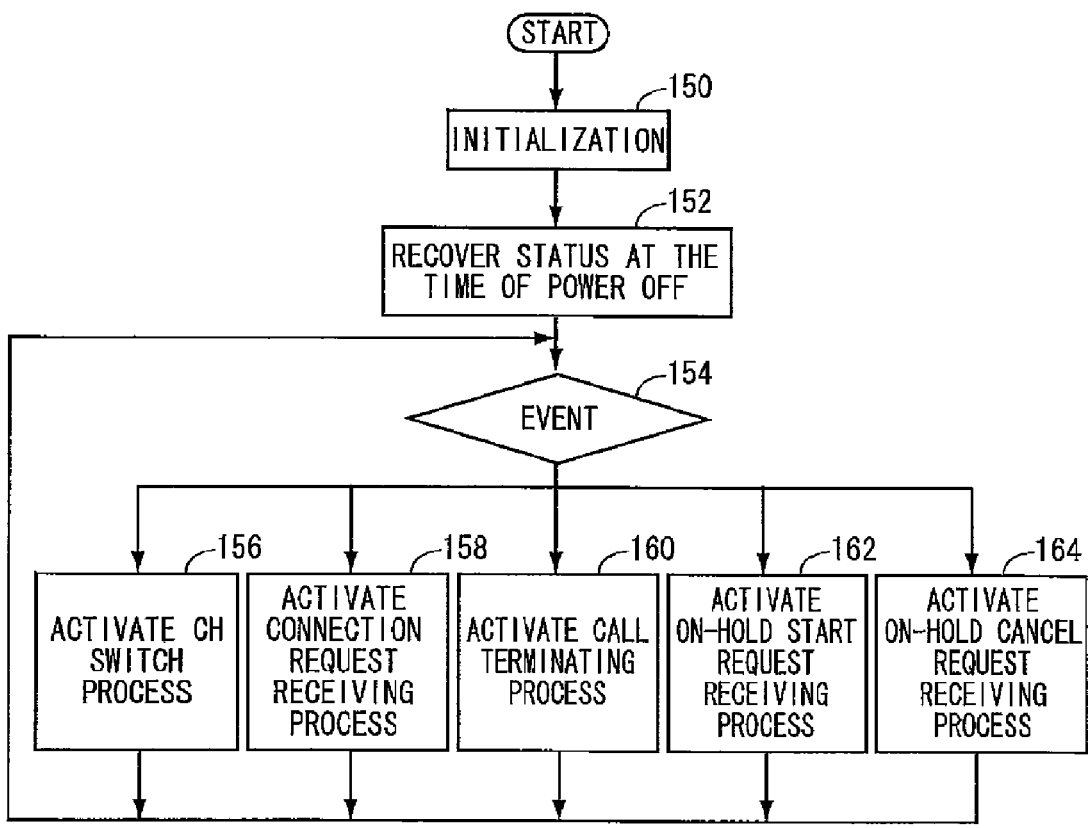
FIG. 6 is a flowchart of a program executed for controlling call status in TV 1 with a calling function shown in FIG. 2.

FIG. 6 schematically shows an overall control structure of the computer software realizing various functions of TV 1 with calling function. The routine shown in FIG. 6 realizes the function that corresponds to control unit 111, which is activated when TV 1 with calling function is powered on. Referring to FIG. 6, when the power is turned on, initialization takes place at step 150, and at step 152, the status when the power was turned off is recovered. Assuming that sound and video of a program of a certain channel were output through audio/video input/output unit 103 at the time when the power was turned off, by the process of step 152, the sound and video of a program that is executed at the time of power on of the same channel are output through audio/video input/output unit 103 when TV 1 with calling function is powered on the next time.

Next, at steps 154, control waits for an occurrence of an event. In response to any event that occurs, corresponding appropriate program as described below is activated, and then the control returns to the event-waiting status.

Specifically, when a channel switching operation is done by a remote or the like, not shown, the flow proceeds to step 156, and the channel switching process is activated. When a connection request related to a call is received from another device, the flow proceeds to step 158, and a connection request receiving process is activated. When a call terminating operation is done by an operator while the calling program is being executed, the flow proceeds to step 160, and the call terminating process is activated. When an on-hold starting request is applied from another device, the flow proceeds to step 162, and the on-hold starting request receiving process is activated. When an on-hold canceling request is applied from another device, the flow proceeds to step 164, and the on-hold canceling request receiving process is activated.

After these processes, the control returns to step 154, and again waits for any event.

Channel Switching Process

Figure 7:
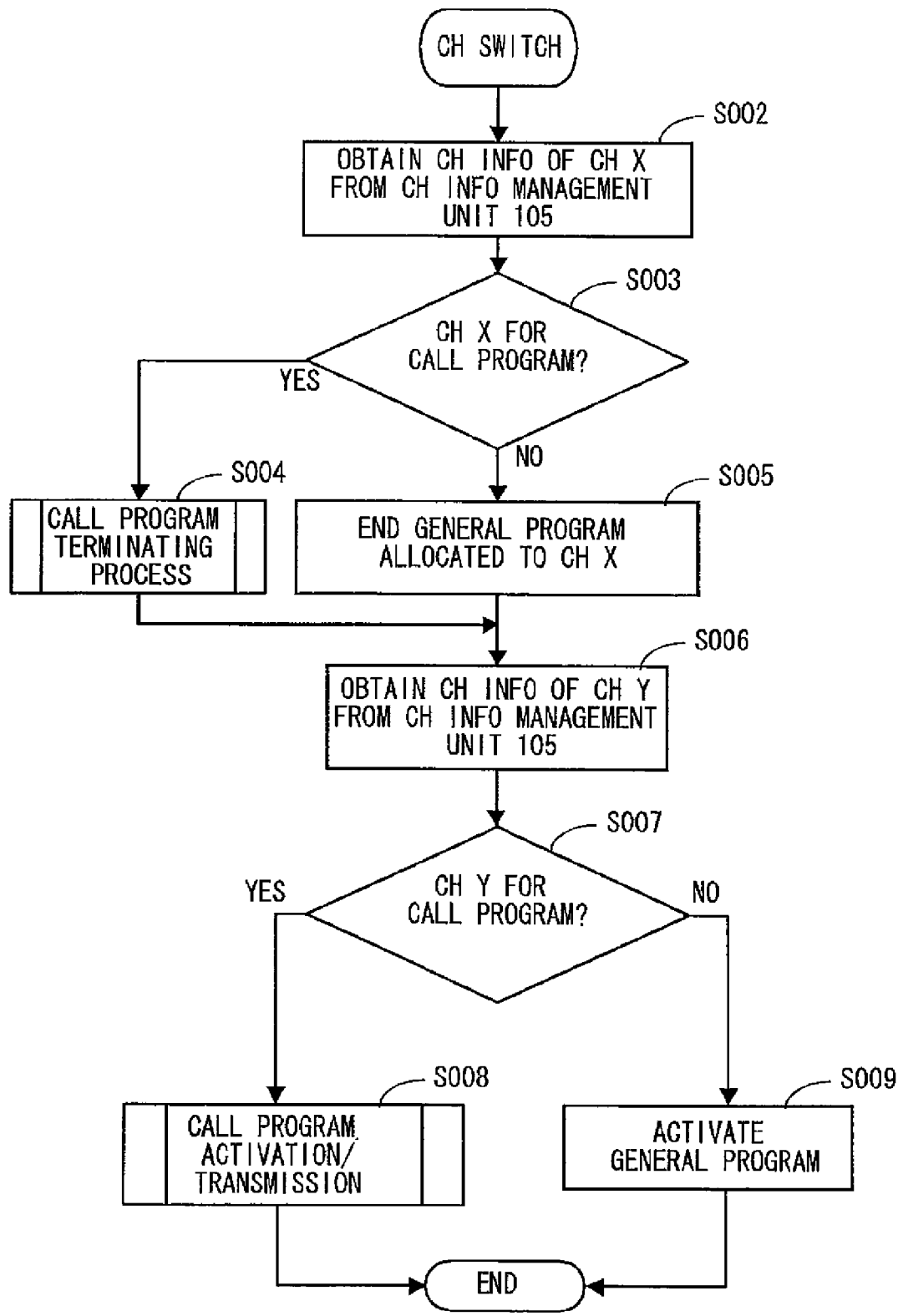
FIG. 7 is a flowchart representing a control structure of a program executed when a channel is changed in TV 1 with a calling function shown in FIG. 2.

FIG. 7 is a flowchart representing the control structure of the program realizing the channel switching process activated at step 156 of FIG. 6. The process is activated when a channel switching operation is made by operation input unit 101 in TV 1 with a calling function.

If the process performed upon input of the channel switching operation were the same when the general program is executed and when the calling program is executed, a problem, such as disruption of a call caused by erroneous channel changing operation, would arise, when the calling program is executed. In order to solve such a problem, in the present embodiment, the process at the time of channel change is made different depending on whether the program executed at the time of channel change is a general program or the calling program. FIG. 7 shows the process procedure for this purpose.

For simplicity of description, in the flowchart of FIG. 7, the channel No. at present is denoted by X, and it is assumed that the channel switching operation to channel Y is performed.

Referring to FIG. 7, the program is activated when operation input unit 101 receives the channel switching operation to channel Y (step 154→156 of FIG. 6). First, by making reference to channel mapping information 102 of channel information management unit 105 shown in FIG. 3, the channel No. that is being displayed at present is obtained (S002). Based on channel mapping information 120, whether the channel X that is being displayed at present is a calling program channel or not is determined (S003), and if it is the calling program channel, the calling program terminating process is performed (S004). This process will be described in detail later with reference to FIG. 8. If the channel X that is being displayed at present is not the channel allocated to the calling program, the general program that is being executed at present is terminated (S005).

Next, by making reference to channel mapping information 120 of channel information management unit 105, channel information corresponding to channel No. Y is obtained (S006). Whether channel Y is a channel allocated to the calling program or not is determined (S007), and if it is the channel to which the calling program is allocated, a call activation/transmission process is performed, using the channel information as an argument (S008). This process will be described in detail later with reference to FIG. 11.

If channel Y is not the channel allocated to the calling program, a general program that corresponds to channel Y is activated (S009). By way of example, if channel Y corresponds to television broadcast, reception frequency of broadcast input unit 102 is set to the frequency of the TV broadcast, and the TV broadcast input to broadcast input unit 102 is output through sound/video input/output unit 130. If channel Y is a mail program or a Web browsing program, corresponding application is activated.

After steps S008 and S009, this process is terminated.

Call Terminating Process

Figure 8:
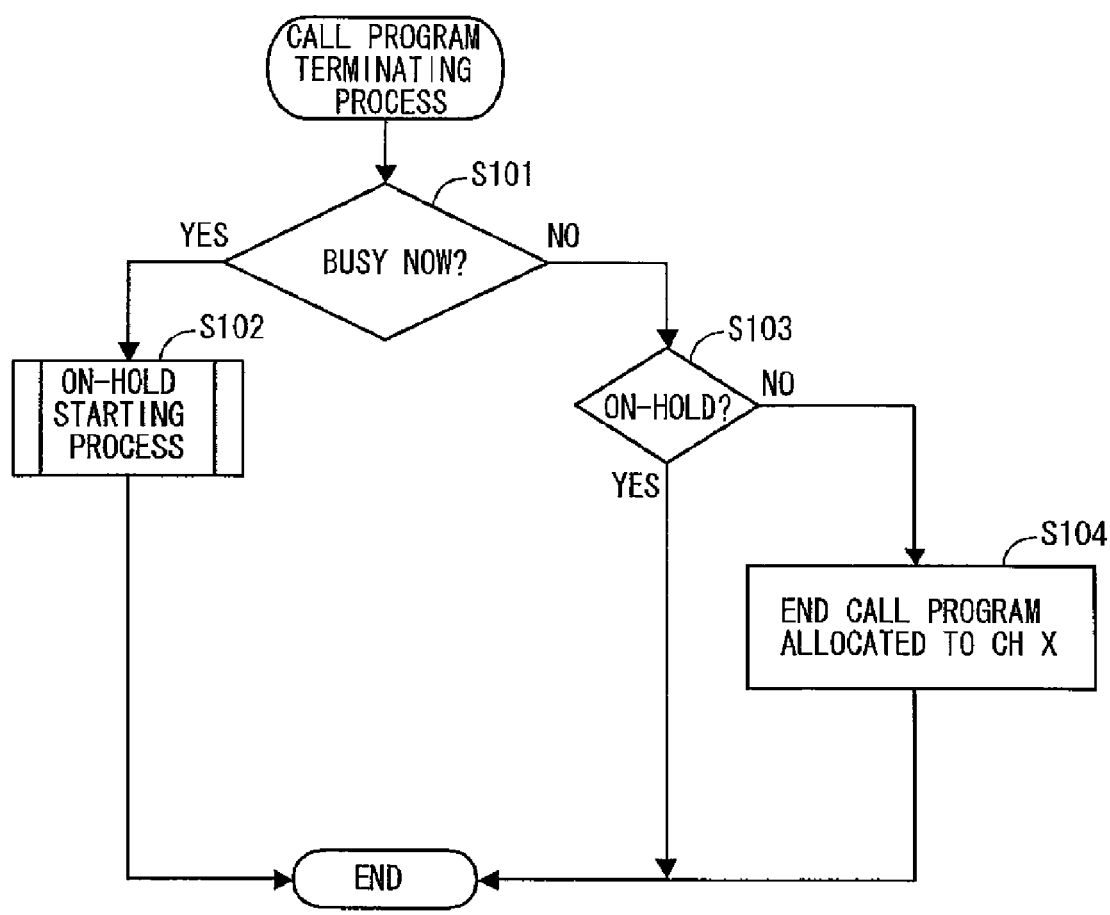
FIG. 8 is a flowchart representing a control structure of a program executed when the calling program is terminated in TV 1 with a calling function shown in FIG. 2.

FIG. 8 shows details of the calling program terminating process shown at step S004 of FIG. 7. If the program is simply terminated at the time of channel change, a problem of disruption of a call because of erroneous operation might occur. Therefore, in the present embodiment, when the channel is changed during execution of the calling program, the call is kept on-hold, and then the channel is changed. FIG. 8 shows a control structure of the program for this purpose.

First, by making reference to call status flag 140 of call status flag processing unit 107, whether it is busy at present or not is determined (S101). If it is busy, the on-hold starting process is performed (S102). This process will be described in detail with reference to FIG. 9. If a call is not in progress at present, an inquiry is made to on-hold information management unit 106, and making reference to on-hold information 130, whether communication is on-hold or not is determined (S103). If it is determined to be the on-hold status, the on-hold status is maintained and the calling program is not terminated, and the calling program terminating process ends. If it is not the on-hold status, the calling program allocated to the current channel is terminated (S104), and the calling program terminating process ends.

On-Hold Starting Process

Figure 9:
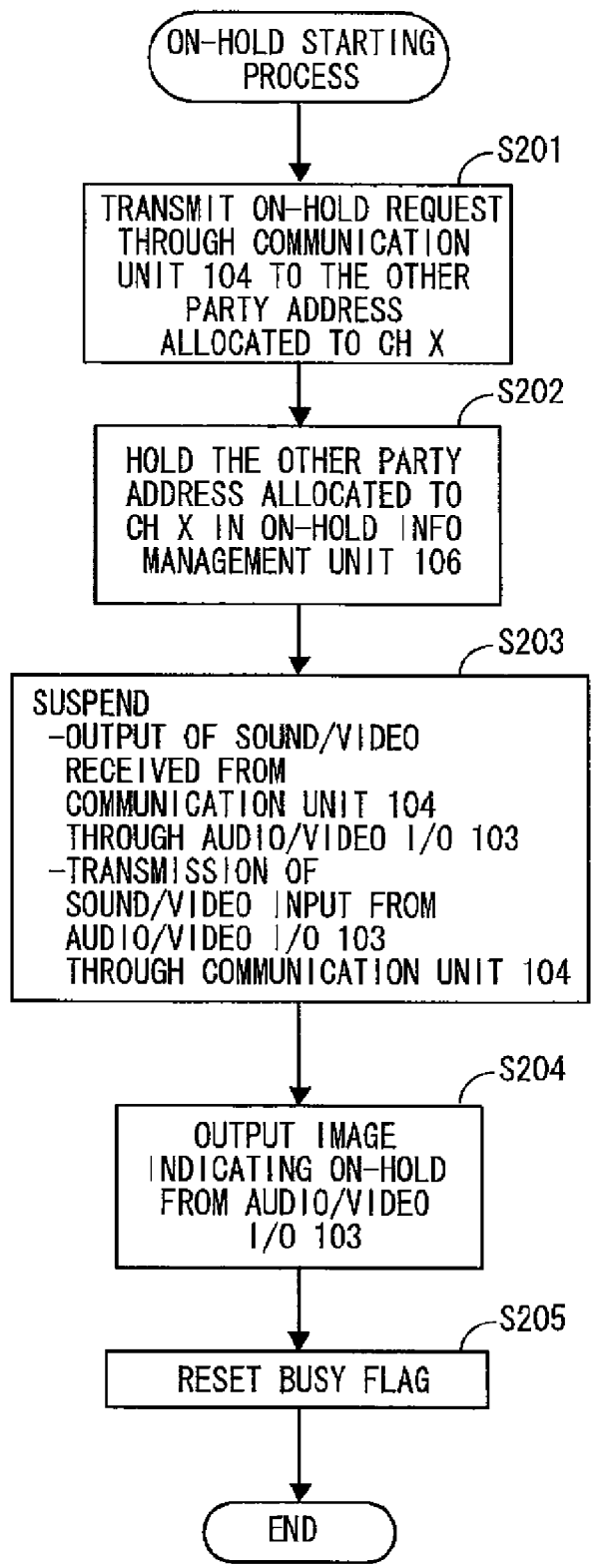
FIG. 9 is a flowchart representing a control structure of a program executed when the on-hold status starts in TV 1 with a calling function shown in FIG. 2.

FIG. 9 is a flowchart representing a program realizing the on-hold starting process executed at step 102 of FIG. 8. Referring to FIG. 9, to the address of the other party allocated to channel X, an on-hold request is transmitted through communication unit 104 (S201). Next, the address of the other party allocated to channel X is registered with on-hold information management unit 106 (S202). Next, the following two processes are suspended (S203).

(1) The process of outputting the sound/video received from communication unit 104 through audio/video input/output unit 103; and (2) the process of transmitting the sound/video input from audio/video input/output unit 103 through communication unit 104.

Then, the video/sound indicating the on-hold status generated by on-hold sound/video generating unit 110 is output from the video output unit of audio/video input/output unit 103 (S204). Finally, the value of call status flag 140 of call status flag processing unit 107 is reset to "0" (S205), and the on-hold starting process ends.

In the on-hold starting process, by way of example, a timer may be set simultaneously with the start of the on-hold starting process, the time may be reset if the on-hold is cancelled, and the on-hold status may automatically be stopped. By such an arrangement, the situation in which on-hold status is kept endlessly and forgotten can be prevented.

Figure 10:
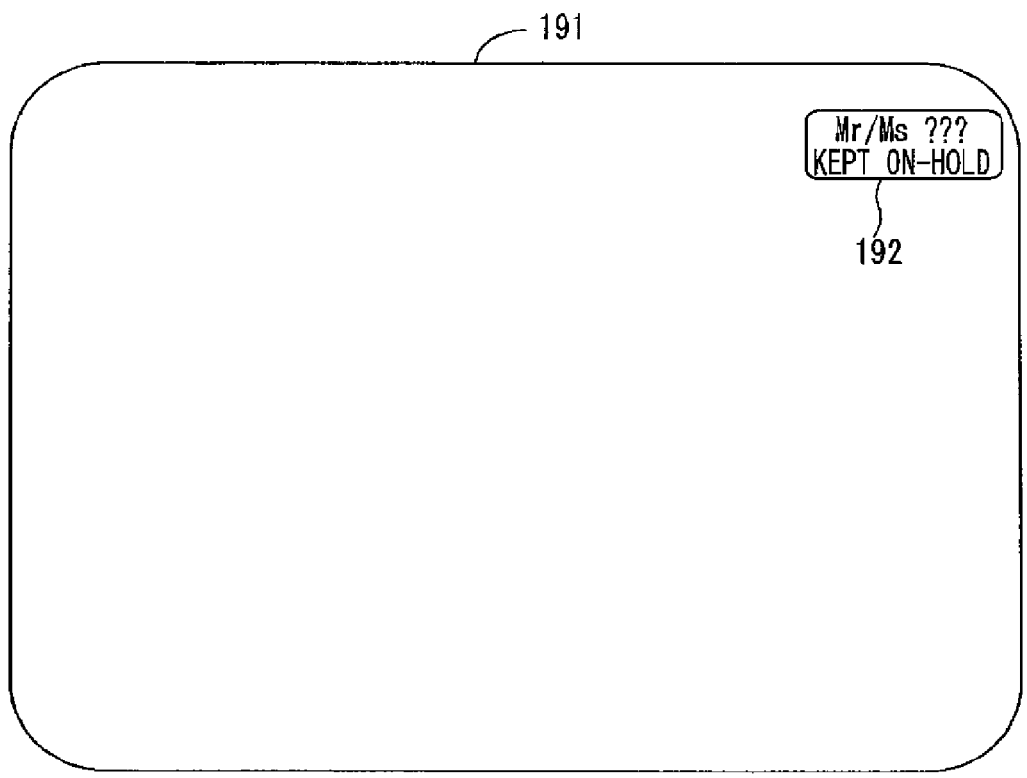
FIG. 10 is a schematic illustration showing an on-hold image displayed in the on-hold status, on TV 1 with a calling function shown in FIG. 2.

FIG. 10 shows an exemplary image indicating that the communication is on-hold, generated by on-hold sound/on-hold video generating unit in accordance with the present embodiment. Referring to FIG. 10, on a TV screen 191, a program of new channel Y is displayed (illustration omitted). When on-hold status starts, an on-hold image 192 generated by on-hold sound/on-hold video generating unit 110 is displayed on an upper right corner of the screen. In the example shown in FIG. 10, on-hold image 192 includes a display that communication is being on-hold, and a display of the name of the other party who is kept on-hold.

Naturally, the present invention is not limited to such an embodiment. Only the fact that the communication is on-hold may be displayed, or the time lapse from the start of on-hold status may be displayed together. Though the on-hold image is displayed in a combined manner on the upper right corner of the screen as shown in FIG. 10, the on-hold image may not be displayed and only the on-hold sound may be generated and output from an audio output unit of the audio/video input/output unit 103. The same image as this one may be displayed if the on-hold status is forced, or an image indicating that communication is kept on-hold by the other party may be separately generated and displayed.

Calling program Activation/Transmission Process

Figure 11:
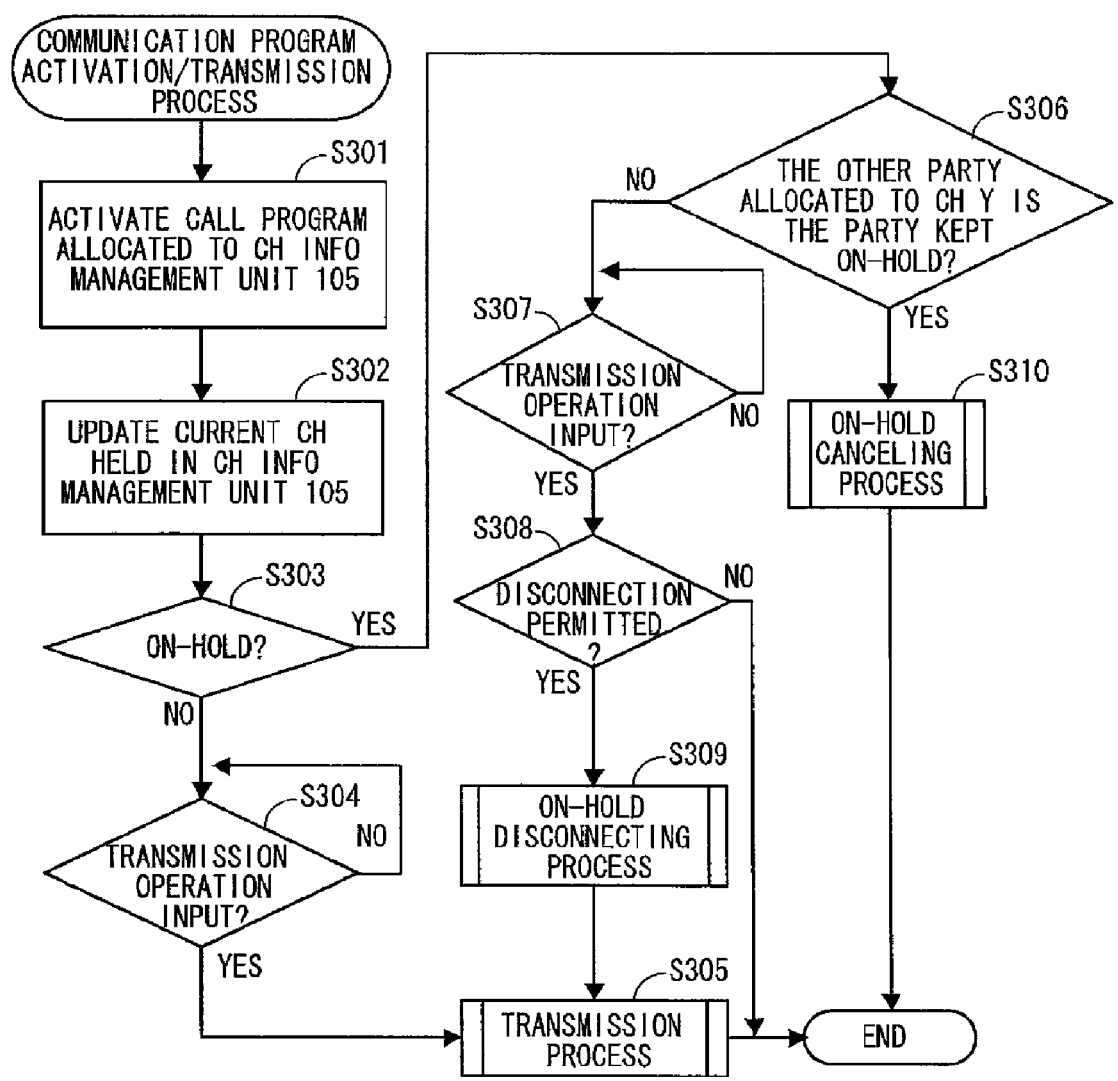
FIG. 11 is a flowchart representing a control structure of a program executed when the calling program is activated, in TV 1 with a calling function shown in FIG. 2.

FIG. 11 shows details of the calling program activation/transmission process shown at step S008 of FIG. 7. The function realized by the process corresponds to the function of calling program processing unit 109. Referring to FIG. 11, when an activation instruction is issued to the calling program with channel designation, the calling program obtains the designated channel information from channel information management unit 105 and displays an initial image (S301). In the present embodiment, the initial image refers to an image displaying the image and name of the other party of the call. Such information can be obtained, based on the address of the other party included in the channel information obtained from channel information management unit 105, from a storage device, not shown, storing in advance such information in correspondence to the address information. Alternatively, the image may be a presence indicating the status of the other party, obtained through communication unit 104 based on the obtained address. By the display of the initial image, the user recognizes start of the calling program.

Next, the channel information of channel information management unit 105 is updated to the channel that is being displayed at present. Assuming that channel Y is newly designated as described above, Y is entered to the channel information representing the channel that is currently on display (S302).

Next, whether any call is kept on-hold or not is confirmed, by making reference to on-hold information 130 of on-hold information management unit 106 (S303). If there is no party kept on-hold, control waits for an input of transmission operation (S304). When the transmission operation such as pressing of a transmission button of the remote through operation input unit 101 is made, the transmission process is performed (S305). The transmission process will be described later.

If a party is kept on-hold, whether the address of the party allocated to channel Y is the same as the address of the on-hold party registered with on-hold information management unit 106 or not is determined (S306). If the address of the party allocated to channel Y is different from the on-hold party address registered with on-hold information management unit 106, calling program processing unit 109 waits for an input of transmission operation with the initial image kept displayed (S307).

When there is a transmission operation input, a confirmation message as to whether the call that is kept on-hold may be disconnected or not is output from audio/video input/output unit 103, urging an input from the user (S308). When an operation permitting disconnection such as pressing of an enter key of the remote is input through operation input unit 101, on-hold disconnecting process is performed (S309), the transmission process is performed (S305), and the calling program activation/transmission process ends.

When an operation not permitting disconnection such as pressing of a cancel key or a return key of the remote is input through operation input unit 101, no process is done and the calling program activation/transmission process ends.

If the address of the party allocated to channel Y is the same as the on-hold party address registered with on-hold information management unit 106, an on-hold canceling process is performed (S310). The on-hold canceling process will be described later.

Transmitting Process

Figure 12:
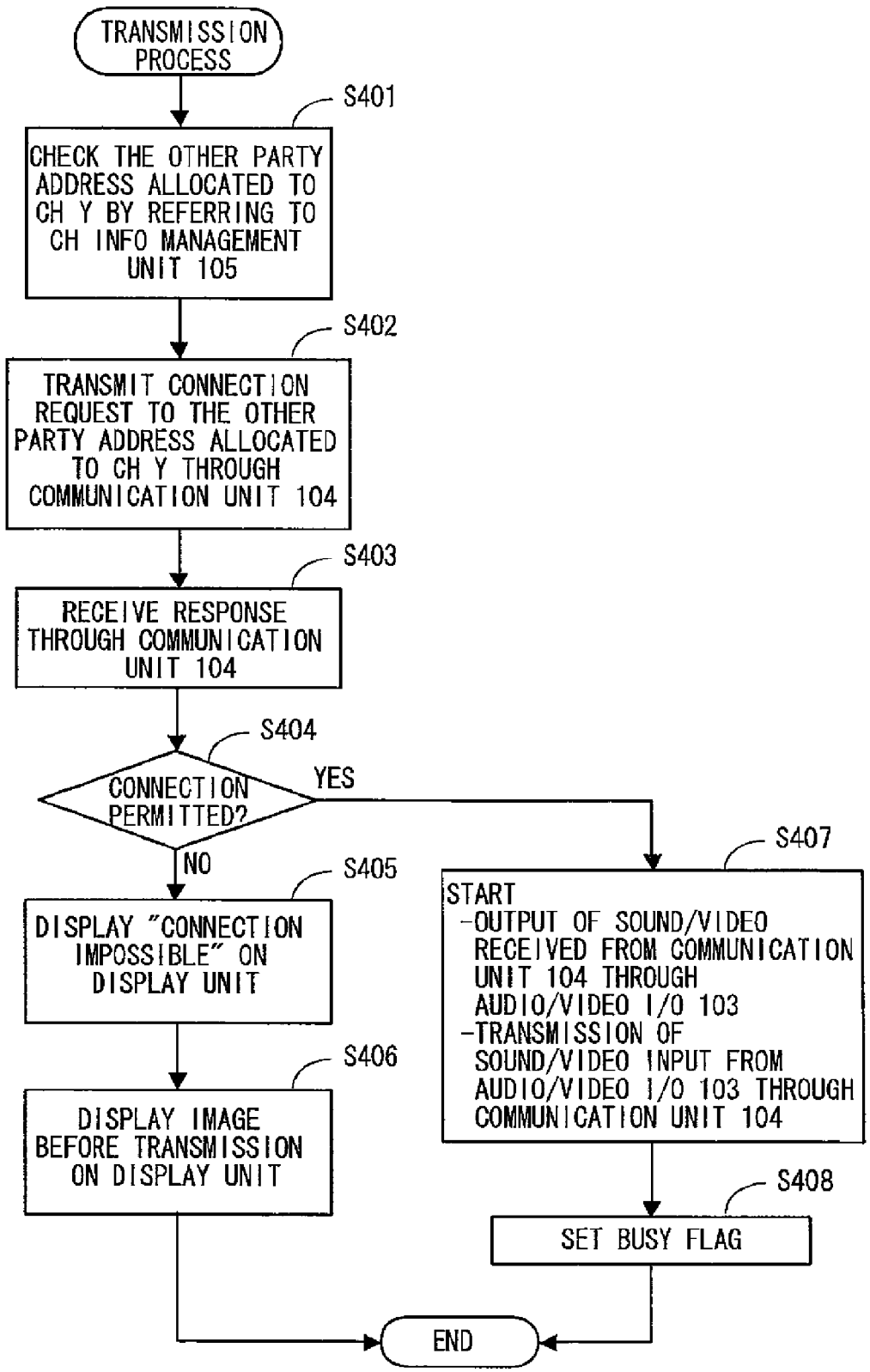
FIG. 12 is a flowchart representing a control structure of a program executed at the time of an outgoing call, in TV 1 with a calling function shown in FIG. 2.

FIG. 12 shows details of the transmitting process performed at step S305 of FIG. 11. Referring to FIG. 12, first, by checking channel mapping information 120 of channel information management unit 105, the address of the other party allocated to channel Y is found (S401). To the address of the party allocated to channel Y, a connection request is transmitted through communication unit 104 (S402). Thereafter, a response from the address of the party is received through communication unit 104 (S403).

Whether the received response is a connection permission or not is determined (S404), and if it is not a permission, a massage "connection impossible" is displayed on audio/video input/output unit 103 (S405). Thereafter, the image displayed before the transmission process is again displayed on the display device of audio/video input/output unit 103 (S406).

If the received response is a connection permission, the process of outputting the video and sound received from communication unit 104 through audio/video input/output unit 103, and the process of transmitting the video and sound input from audio/video input/output unit 103 through communication unit 104 are started (S407). Along with this process, the call status flag 140 shown in FIG. 5 is set to the value "1" indicating the busy status (S408).

On-Hold Canceling Process

Figure 13:
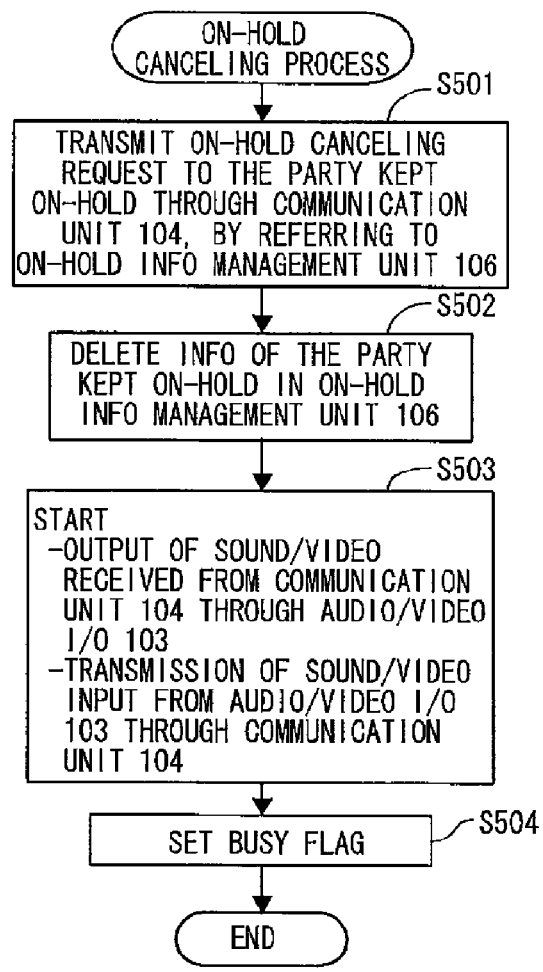
FIG. 13 is a flowchart representing a control structure of a program executed when the on-hold status is canceled, in TV 1 with a calling function shown in FIG. 2.

FIG. 13 shows details of the on-hold canceling process performed at step S310 of FIG. 11. Referring to FIG. 13, first, the address of the on-hold party is obtained from on-hold information 130 of on-hold information management unit 106, and an on-hold canceling request is transmitted to the on-hold party through communication unit 104 (S501). Next, the on-hold party information is deleted from on-hold information management unit 106 (S502). The operation of the calling program is resumed, and the process of outputting the video and sound received from communication unit 104 through audio/video input/output unit 103 and the process of transmitting the video and sound input from audio/video input/output unit 104 are started (S503). Finally, the call flag is set to the value "1" indicating the busy status (S504).

On-Hold Disconnecting Process

Figure 14:
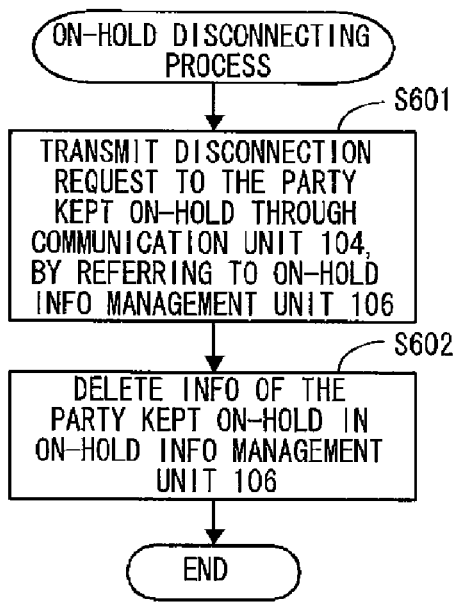
FIG. 14 is a flowchart representing a control structure of a program executed when the on-hold status is disconnected, in TV 1 with a calling function shown in FIG. 2.

FIG. 14 shows details of the on-hold disconnecting process performed at step S309 of FIG. 11. This process is performed when a new transmission takes place while a call is on-hold, when a call terminating operation is input when a call is on-hold, or the on-hold is time-out. Referring to FIG. 14, the address of the party kept on-hold at present is obtained from on-hold information management unit 106, and a disconnection request is transmitted to the party through communication unit 104 (S601). Next, the on-hold party information is deleted from on-hold information management unit 106 (S602), and the process ends.

As described with reference to FIG. 9, when the timer has been set in the on-hold starting process, the on-hold disconnection process is executed at the expiration of the timer. Here, the timer is reset when the process ends.

In the foregoing, details of the processes performed at the time of channel change have been described. In the following, behavior of TV 1 with a calling function in accordance with the embodiment of the present invention when a call termination operation is done, will be described.

Call Terminating Process

Figure 15:
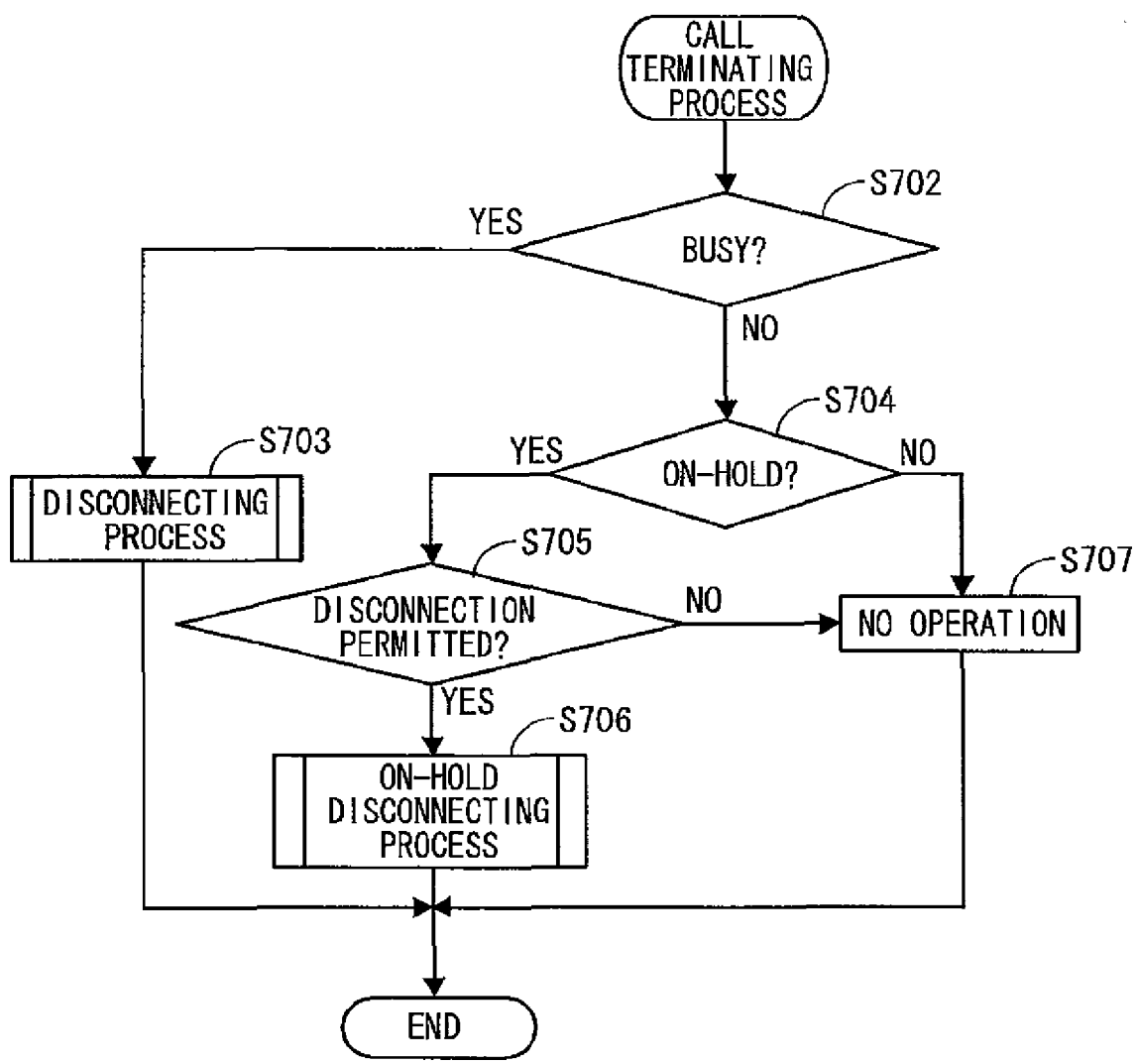
FIG. 15 is a flowchart representing a control structure of a program executed at the time of termination, in TV 1 with a calling function shown in FIG. 2.

FIG. 15 shows details of the process executed by TV 1 with a calling function when the call terminating operation is input. Referring to FIG. 15, this process is activated when the call terminating operation is input through operation input unit 101 by, for example, pressing a call terminating button on the remote or the like. First, whether a call is in progress at present or not is determined by making reference to call status flag 140 of call status flag processing unit 107 (S702). If a call is in progress, the process of disconnection from the other party of the call is performed (S703). The disconnection process will be described later.

If a call is not in progress, whether there is any party who is kept on-hold at present or not is determined by making reference to on-hold information 130 of on-hold information management unit 106 (S704).

If there is a party who is kept on-hold, inquiry is sent to the user as to whether disconnection from the on-hold party is permitted or not (S705). If an instruction permitting disconnection is input, the on-hold disconnecting process to the on-hold party is performed (S706), and the call terminating process ends. If an instruction not permitting disconnection is input, no process is done (S707), and the call terminating process ends.

If it is determined at step S704 that there is no party kept on-hold, no process is done (S707), and the call terminating process ends.

Disconnection Process

Figure 16:
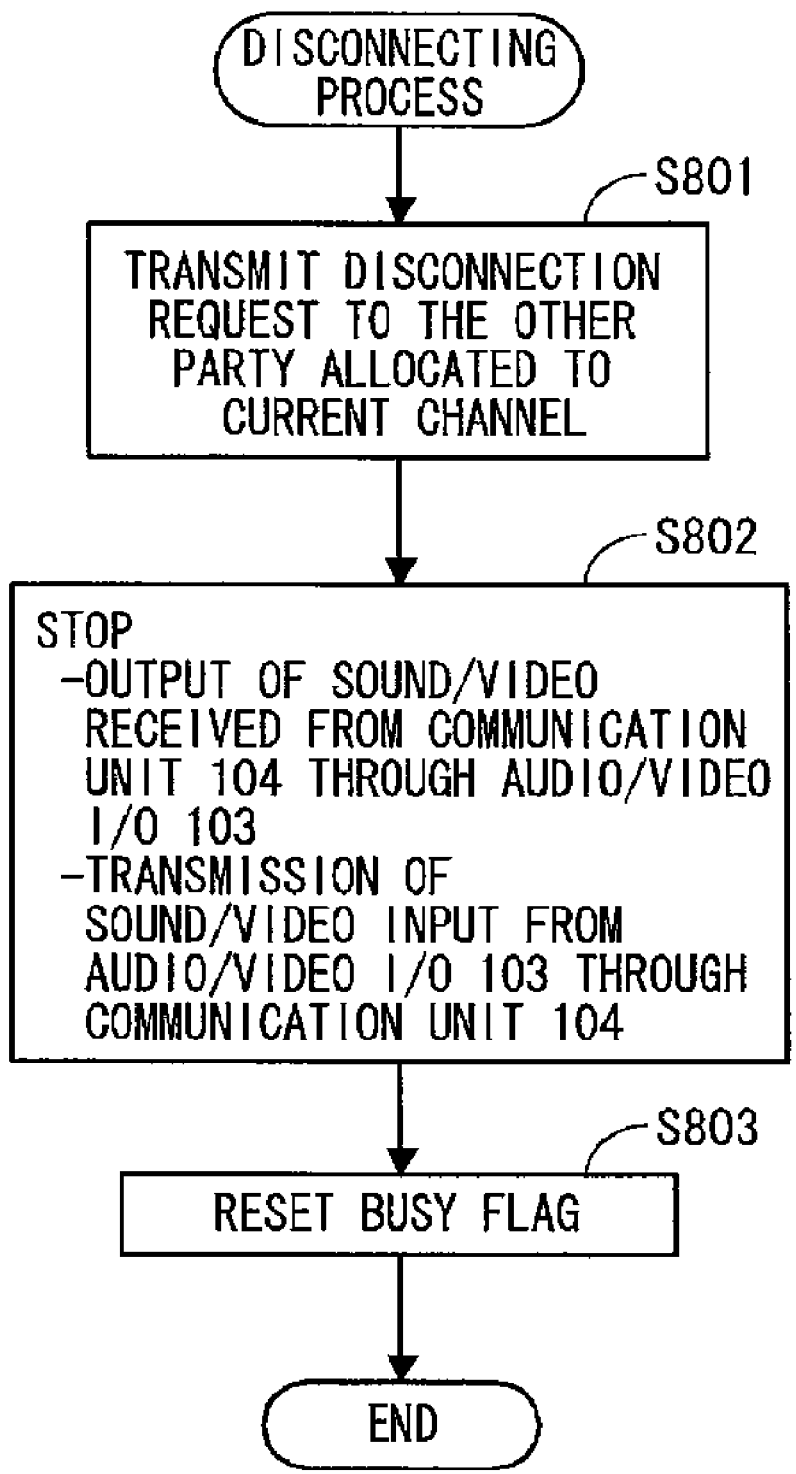
FIG. 16 is a flowchart representing a control structure of a program executed at the time of disconnection, in TV 1 with a calling function shown in FIG. 2.

FIG. 16 shows details of the disconnecting process executed by the calling program. In the disconnection process, the calling program transmits a disconnection request to the other party of the call that is in progress at present, through communication unit 104 (S801). The calling program thereafter stops the following two processes (S802).

(1) The process of outputting the sound/video received from communication unit 104 through audio/video input/output unit 103; and (2) the process of transmitting the video input from audio/video input/output unit 103 through communication unit 104.

Finally, the call status flag 140 of call status flag processing unit 107 is reset to "0" representing that a call is not in progress (S803), and the disconnection process ends.

On-Hold Start Request Receiving Process

Figure 17:
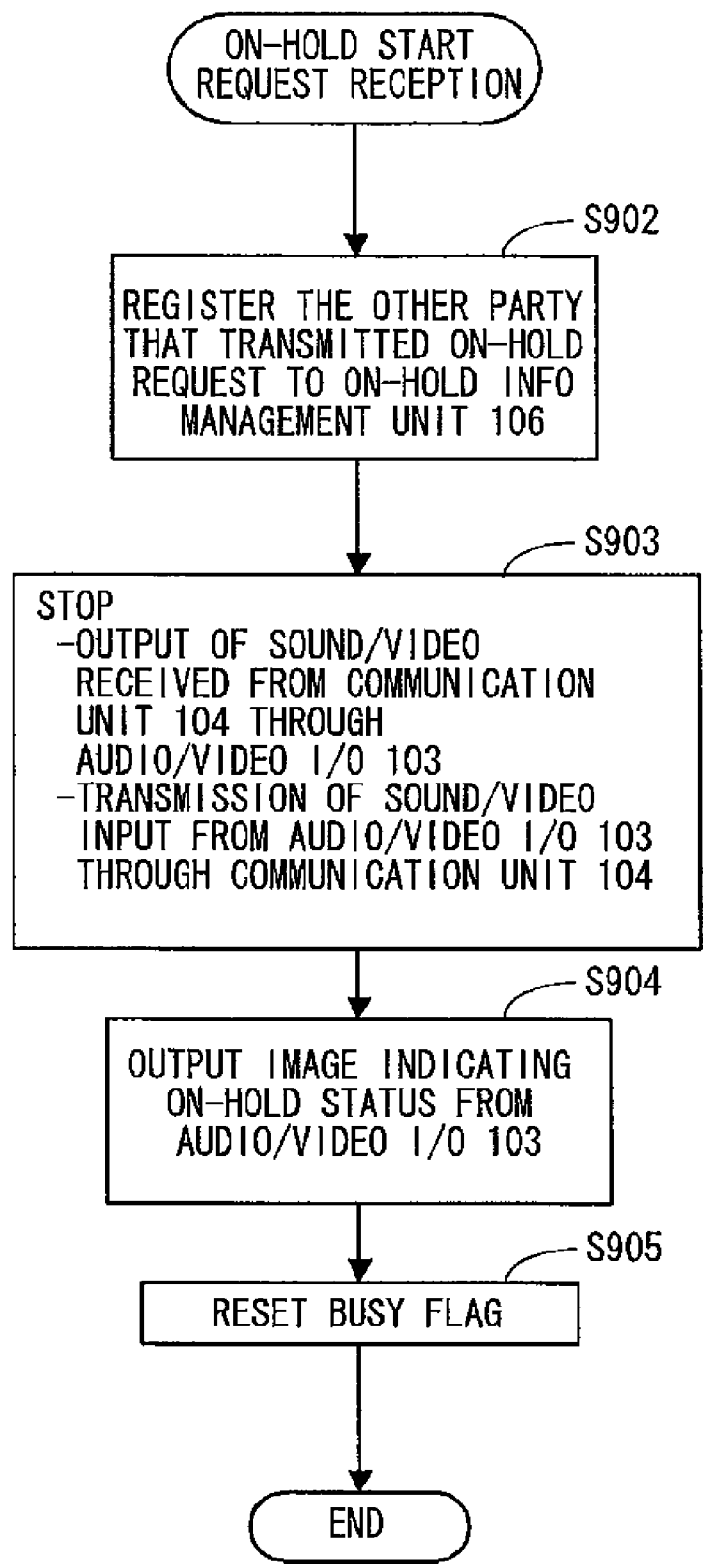
FIG. 17 is a flowchart representing a control structure of a program executed when an on-hold starting request is received, in TV 1 with a calling function shown in FIG. 2.

With reference to FIG. 17 and the following figures, a process when any request is received from the other party of the call will be described. FIG. 17 shows details of the process when communication unit 104 receives an on-hold start request during a call. This process is activated when the communication unit 104 receives the on-hold start request from the other party of the call. First, the address of the party that has transmitted the on-hold request is registered with the on-hold requesting party information in on-hold information 130 of on-hold information management unit 106 (S902).

Next, the following steps are stopped (S903).

(1) The process of outputting the sound/video received from communication unit 104 through audio/video input/output unit 103; and (2) the process of transmitting the sound/video input from audio/video input/output unit 103 through communication unit 104.

Next, an image representing that a call is on-hold is output from audio/video input/output unit 103 (S904). Here, only a message notifying the on-hold status may be displayed, or information such as the address or name of the other party may be displayed.

Finally, the call status flag of call status flag processing unit 107 is reset to "0" representing that a call is not in progress (S905). Here, viewing of other channel while keeping the call on-hold poses no problem.

On-Hold Canceling Request Receiving Process

Figure 18:
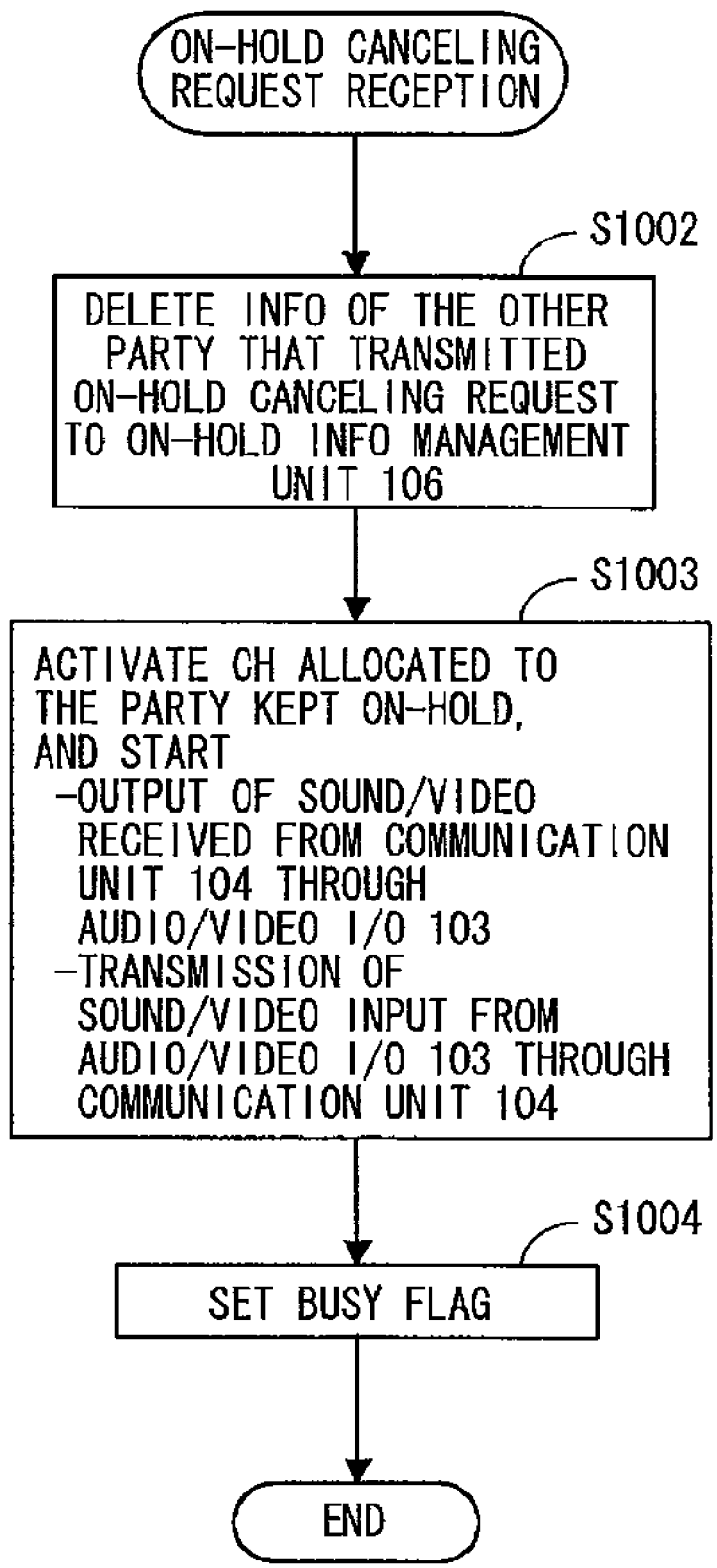
FIG. 18 is a flowchart representing a control structure of a program executed when an on-hold cancellation request is received, in TV 1 with a calling function shown in FIG. 2.

FIG. 18 shows details of a process when an on-hold canceling request is received from the other party. This process is activated when the on-hold canceling request is received through communication unit 104. First, the information of the party that has transmitted the on-hold canceling request is deleted from the on-hold requesting party information of on-hold information management unit 106 (S1002).

A channel allocated to the party of the on-hold call is activated, and the following processes are started (S1003).

(1) The process of outputting the sound/video received from communication unit 104 through audio/video input/output unit 103; and (2) the process of transmitting the sound/video input from audio/video input/output unit 103 through communication unit 104.

Finally, the call status flag 140 of call status flag processing unit 107 is set to "1" representing the busy status (S1004), and the on-hold canceling request receiving process is terminated. Thus, the party that has been kept on-hold can resume the call from the on-hold status.

Connection Request Receiving Process

Figure 19:
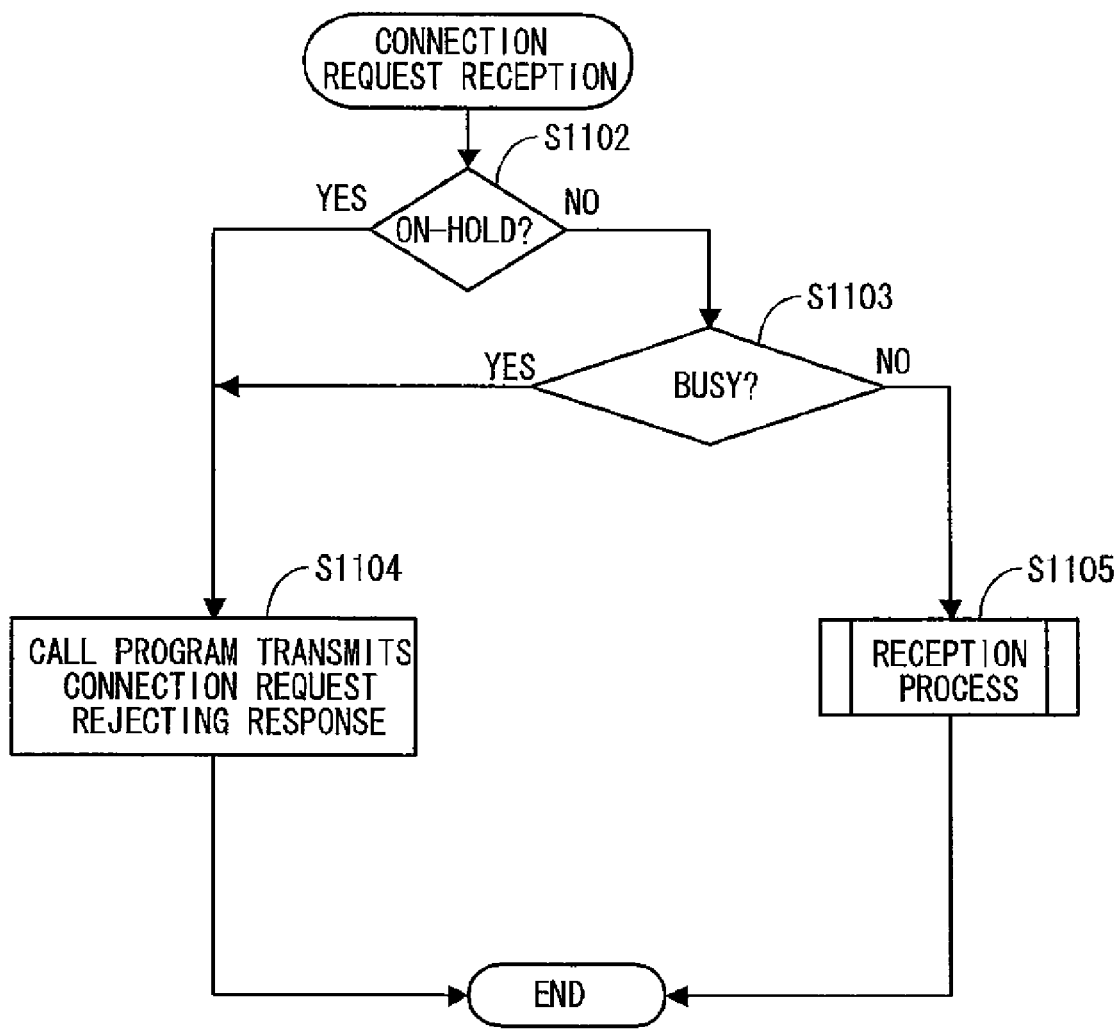
FIG. 19 is a flowchart representing a control structure of a program executed when a connection request is received, in TV 1 with a calling function shown in FIG. 2.

FIG. 19 shows details of the process when a call is received, that is, when a connection request is received. The process starts when a connection request is received through communication unit 104. Referring to FIG. 19, by making reference to the on-hold party information and on-hold requesting party information of on-hold information management unit 106, whether there is any call that is kept on-hold or not is confirmed (S1102). If there is a call that is kept on-hold, a connection request rejecting response is transmitted through communication unit 104 to the address of the party that has transmitted the connection request (S1104). If there is no call that is kept on-hold, whether a call is in progress or not is confirmed by making reference to call status flag 140 of call status flag processing unit 107 (S1103). If a call is in progress, a connection request rejecting response is transmitted through communication unit 104 to the address of the party that has transmitted the connection request (S1104). If a call is not in progress, a call receiving process is performed (S1105). The call receiving process will be described later.

In the connection request receiving process, the order of on-hold confirmation (S1102) and the call status confirmation (S1103) may be reversed or these may be performed simultaneously.

Call Receiving Process

Figure 20:
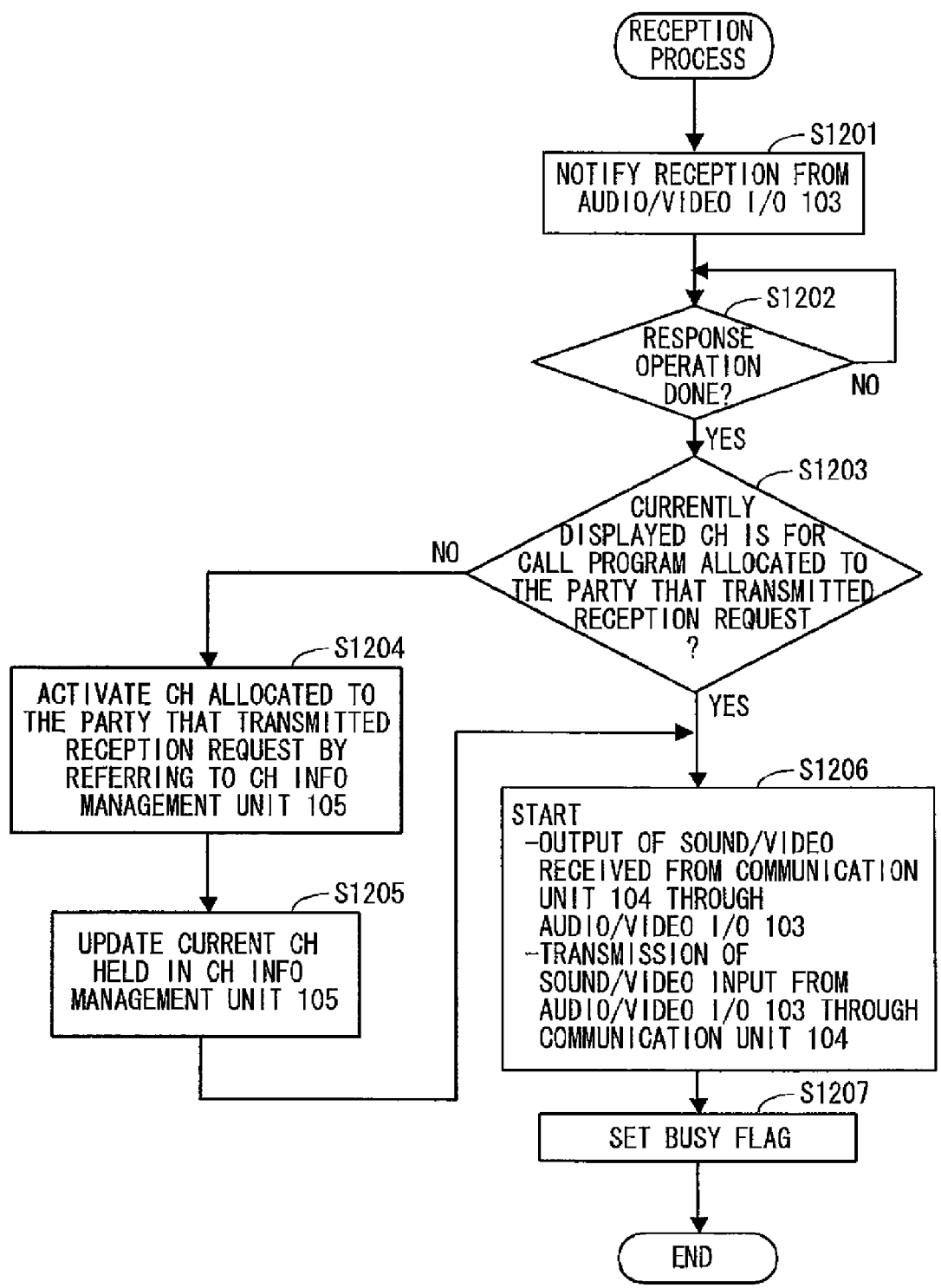
FIG. 20 is a flowchart representing a control structure of a program executed when a call is received, in TV 1 with a calling function shown in FIG. 2.

FIG. 20 shows details of the call receiving process executed at step S1105 of FIG. 19. When a call is received while TV with a calling function is displaying TV broadcast or the like, a ring tone is generated or an image indicating an incoming call is displayed, using audio/video input/output unit 103 (S1201). A lamp or the like for indicating an incoming call may be provided on TV 1 with a calling function.

Thereafter, when a call receiving operation such as pressing of a response button of the remote is input through operation input unit 101 (S1202), whether the channel that is being displayed corresponds to the channel allocated to the calling program for the party that has transmitted the call reception request or not is determined, by making reference to channel information management unit 105 (S1203). If the channel that is being displayed is not the channel allocated to the calling program allocated to the other party of the call, the channel that is being displayed is turned off and a channel allocated to the calling program allocated to the other party of the call is activated (S1204). Further, the channel information of the currently displayed channel in channel information management unit 105 is updated (S1205).

Thereafter, the following processes are performed by the calling program (S1206).

(1) The process of outputting the sound/video received from communication unit 104 through audio/video input/output unit 103; and (2) the process of transmitting the sound/video input from audio/video input/output unit 103 through communication unit 104.

If the channel that is being displayed at present is the channel allocated to the calling program allocated to the party that has transmitted the connection request, the following processes are performed (S1206).

(1) The process of displaying the video received from communication unit 104 on a display of audio/video input/output unit 103;

(2) the process of outputting the sound received from communication unit 104 to an audio output device of audio/video input/output unit 103;

(3) the process of transmitting the video input from the video input device of audio/video input/output unit 103 through communication unit 104; and (4) the process of transmitting the sound input from the audio input device of audio/video input/output unit 103 through communication unit 104.

Finally, the value of call flag is set to a value "1" indicating the busy status, at call status flag processing unit 107 (S1207).

[Operation]

(Initial Operation)

The operation of TV 1 with a calling function related to the first embodiment above will be described briefly. When TV 1 with a calling function is powered-on, various units of TV 1 with a calling function are initialized, and the status of display before power off is resumed. At this time, the value of call status flag 140 shown in FIG. 5 is initialized to "0". Of the on-hold information 130, on-hold party information and on-hold requesting party information are both initialized to blank. In this status, TV 1 with a calling function waits for occurrence of any event.

(Channel Switching)

When the user selects a channel that corresponds to a general program, the channel switching process is activated as shown at step 156 of FIG. 6. Here, steps S002, S003, S005, S006, S007 and S009 are executed in this order, the program of the channel that has been executed is terminated and a program of a new channel starts.

When the user selects a channel corresponding to the calling program, again, the channel switching process shown at step 156 of FIG. 6 is executed. Here, steps S002, S003, S004, S006, S007 and S008 are executed.

At step S008, the calling program activation/transmission process shown in FIG. 11 is executed. In the example described here, steps S301, S302, S303, S304 and S305 are executed and a call starts.

When the user performs a channel switching operation while a call is in progress, here again, the channel switching process shown at step 156 of FIG. 6 is executed. It is noted, however, that steps S002, S003, S004, S006, S007 and S009 of FIG. 7 are executed in this order. At step S004, the calling program terminating process is done.

More specifically, in the calling program terminating process shown in FIG. 8, steps S101 and S102 are executed in this order. In the on-hold starting process of step S102, the process shown in FIG. 9 is executed, an on-hold request is transmitted to the other party of the call as a result (S201), the address of the other party of the call is held in the on-hold party information of on-hold information management unit 106 (S202), and audio/video communication with the other party is suspended (S203). Further, an image indicating that a call is on-hold is output to the display device of audio/video input/output unit 103 (S204), and the value of call status flag 140 shown in FIG. 5 is set to "0".

Again referring to FIG. 7, by the process of step S006, an image after channel switching is displayed on the display device of audio/video input/output device 103, and an image indicating that a call is in progress is displayed on some part of the screen (see FIG. 10).

When there is a channel switching operation to the original call channel in this status, the channel switching process shown at step S156 of FIG. 6 is executed. Here, steps S002, S003, S005, S006, S007 and S008 are executed in this order.

Particularly, at step S008, the processes of steps S301, S302, S303, S306 and S310 shown in FIG. 11 are executed, the on-hold status with the party that has been kept on-hold by the last channel switching operation is cancelled and the call resumes.

(Call Terminating Process)

When the user makes a call terminating operation during a call, the call terminating process is activated as shown at step S160 of FIG. 6. Referring to FIG. 15, here, steps S702 and S703 are executed, and the call is suspended.

When the user makes a call terminating operation while a call is on-hold, the call terminating process is similarly activated as shown at step S160 of FIG. 6. Here, steps S702, S704 and S705 of FIG. 15 are executed, and an inquiry is made to the user as to whether the call that is on-hold may be disconnected or not. If the user permits disconnection, the call is disconnected at step S706. If the user does not permit disconnection, the on-hold status is maintained.

(Reception of Connection Request)

As to the operation when a calling program connection request is received while the channel allocated to a general program is being displayed, the process of step S158 shown in FIG. 6 is executed. It is noted, however, that the operation is branched into two, depending on whether there is any call that is on-hold. When there is no on-hold call, steps S1102, S1103 and S1105 shown in FIG. 19 are executed, and the call with the other party is started. If there is any call that is kept on-hold, steps S1102 and S1104 of FIG. 19 are executed, and a connection rejection request is returned to the party that has transmitted the connection request. As a result, new call is not initiated.

(Reception of On-Hold Start Request from the Other Party)

When an on-hold start request is transmitted from the other party of the call that is in progress, the on-hold start request receiving process is activated as shown at step 162 of FIG. 6. Specifically, steps S902, S903, S904 and S905 shown in FIG. 17 are executed, and TV 1 with a calling function is set to the on-hold status. Here, the address of the other party is stored in the on-hold requesting party information of on-hold information 130 shown in FIG. 4. The value of the call status flag shown in FIG. 5 is set to "0", indicating that the call is not in progress.

(Reception of On-Hold Canceling Request from the Other Party)

When an on-hold canceling request is transmitted from the other party, the on-hold canceling request receiving process is activated as shown at step 164 of FIG. 6. Here, steps S501, S502, S503 and S504 shown in FIG. 13 are executed, and the call is resumed. The on-hold requesting party information of on-hold information 130 is cleared, and the value of call status flag 140 shown in FIG. 5 is set to "1" indicating the busy status.

(EFFECTS OF THE FIRST EMBODIMENT)

As described above, according to the first embodiment of the present invention, when there is a channel switching operation while a calling program is being executed, the calling program is not terminated but kept in on-hold status. Further, an image indicating the on-hold status is displayed on the screen, and therefore, it is unlikely that the on-hold status is forgotten. Further, when the channel is newly switched to the one corresponding to the calling program, the on-hold status is automatically cancelled and the call is resumed. Further, when a call terminating operation is done in the on-hold status, an inquiry is made to the user as to whether the call may be terminated or not.

As a result, in TV 1 with a calling function having channels allocated to general programs such as broadcast reception, electronic mail program and Web browser program and calling program allowing the call with the other party different from the general programs, the call is not disrupted even when a channel operation is done erroneously during the call, and a smooth call can be realized. As the image indicating an on-hold status is displayed on the screen, it is unlikely that the user forgets the on-hold call.

<Second Embodiment>

In the first embodiment described above, when there is a channel switching operation while the calling program is being executed, the channel is switched while the call is kept on-hold. The present invention, however, is not limited to such an embodiment. In the second embodiment, when there is a channel switching operation while the calling program is being executed, such an operation is ignored.

Figure 21:
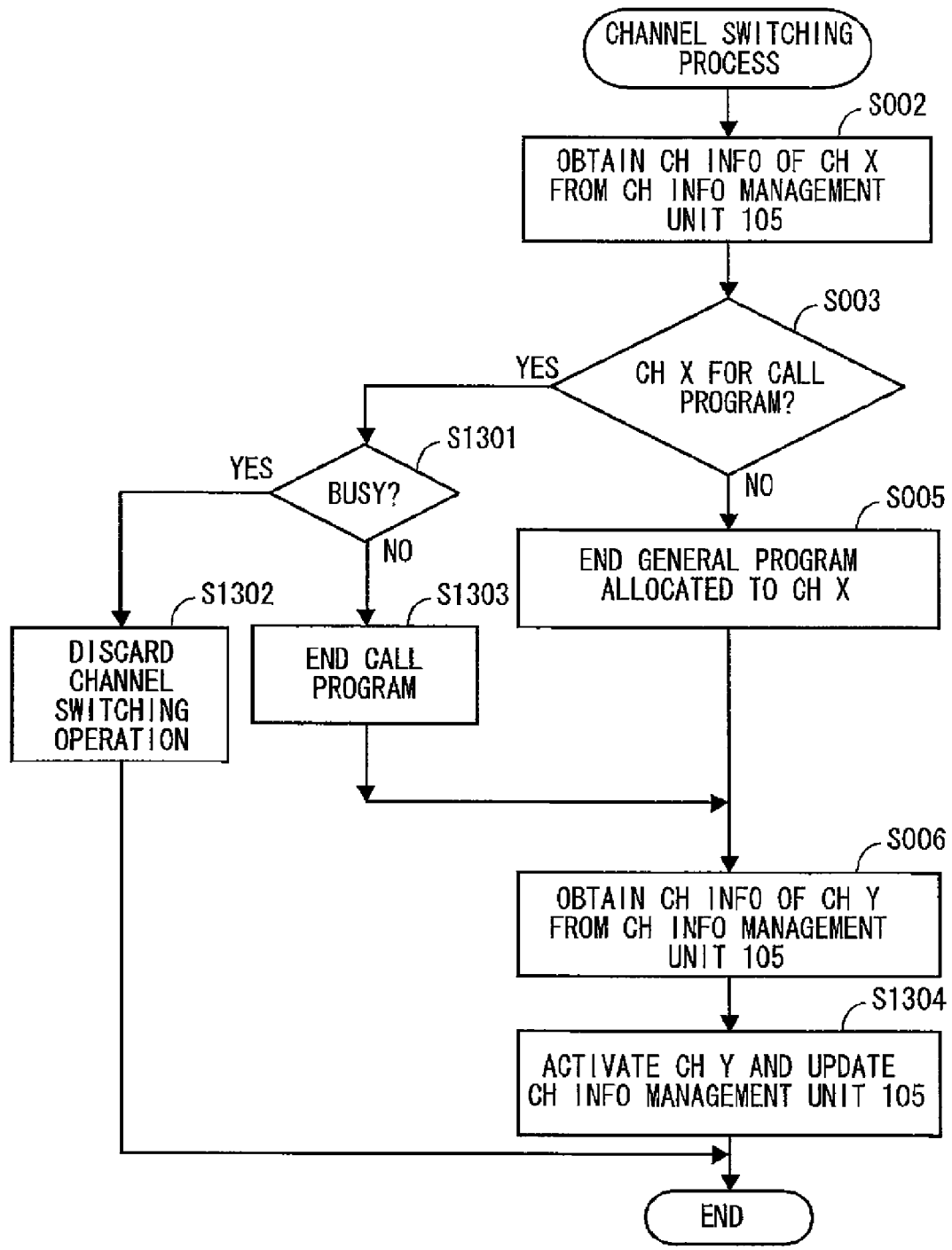
FIG. 21 is a flowchart representing a control structure of a program executed for discarding a changing operation when a channel switching operation is done, in the TV with a calling function in accordance with a second embodiment of the present invention.

FIG. 21 is a flowchart of the channel switching process for this approach. When a channel switching operation is done through operation input unit 101 during a call and this process is performed in place of the channel switching process (step 156 of FIG. 6 and FIG. 7) of the first embodiment, the channel switching operation is discarded and the call is maintained. In the following, similar to the first embodiment, an example of switching from channel X to channel Y will be described.

Referring to FIG. 21, the process is activated in response to the channel switching operation performed by using operation input unit 101. The process steps S002 to S006 are the same as those shown in FIG. 7. It is noted, however, that in the second embodiment, if it is determined at step S003 that a calling program is allocated to channel X at present, whether the call status flag 140 shown in FIG. 5 has the value "1" indicating the busy status or not is determined (S1301).

If the call status flag 140 is "1" indicating the busy status, the channel switching operation input to operation input unit 101 is discarded (S1302), and without any operation, the process is terminated. Therefore, channel is not changed and the call is maintained.

If the call status flag 140 is not "1" indicating the busy status at step S1301, the calling program allocated to channel X is terminated (S1303). Then, information of channel Y is obtained from channel information management unit 105 (S006), channel Y is activated and the channel information of the currently displayed channel is updated in channel information management unit 105, whereby the channel change is finished (S1304).

According to the embodiment, even when a channel switching operation is done erroneously while the calling program is being executed, there is no influence on the calling program. As a result, disruption of the call caused by erroneous channel operation can be prevented, and a smooth call is realized.

<Third Embodiment>

Figure 22:
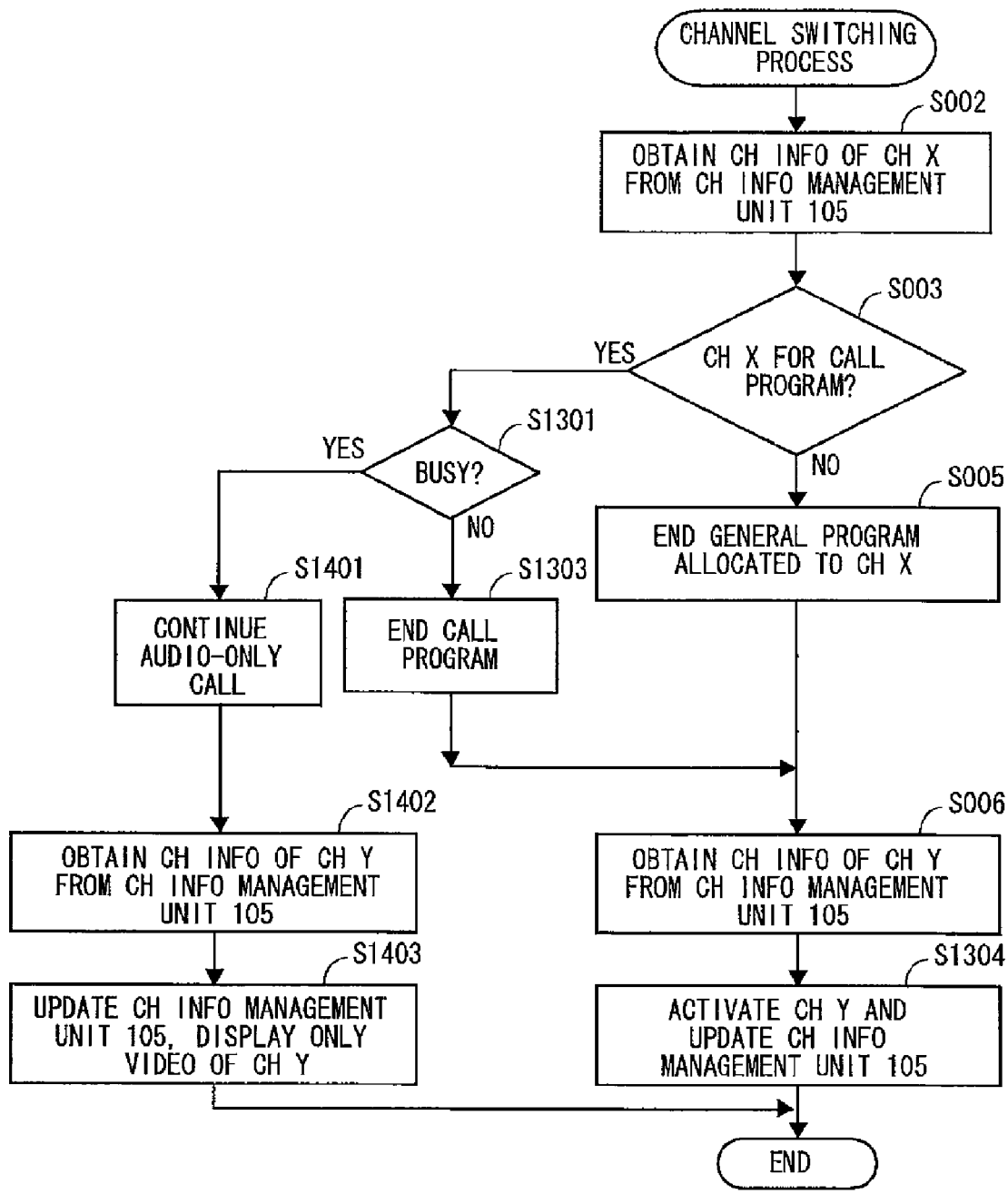
FIG. 22 is a flowchart representing a control structure of a program executed for continuing communication with voice only, when a channel switching operation is done, in the TV with a calling function in accordance with a third embodiment of the present invention.

In the first embodiment described above, when there is a channel switching operation while the calling program is being executed, the channel is switched while the call is kept on-hold. In the second embodiment, when there is a channel switching operation while the calling program is being executed, the channel is switched if a call is not in progress, and the channel switching operation is discarded if a call is in progress. The present invention, however, is not limited to such embodiments. By way of example, when there is a channel switching operation while the calling program is being executed, communication with voice may be continued and only the image display may be switched from the image of the call to the image of the channel as changed. FIG. 22 is a flowchart of the channel switching process for this approach. The third embodiment is also described assuming that a channel switching operation from channel X to channel Y is done.

Referring to FIG. 22, the process is activated when the operation input for the channel switching process is input through operation input unit 101.

Contents of processing at steps S002 to S006 are the same as those shown in FIG. 7. It is noted, however, that in the third embodiment, if it is determined at step S003 that the present channel is allocated to the calling program, whether the call status flag 140 is "1" indicating the busy status or not is determined, by making reference to call status flag 140 of call status flag processing unit 107 (S1301).

If the call status flag 140 has the value "1" indicating the busy status and if the call currently in progress involves transmission/reception of video images through communication unit 104, video transmission/reception is suspended and audio transmission/reception only is continued (S1401). Only the audio input/output using audio/video input/output unit 103 is continued (S1402). Then, information of channel Y is obtained from channel information management unit 105 (S1402), the channel information of the currently displayed channel of channel information management unit 105 is updated, and only the video image of channel Y is displayed using the display device of audio/video input/output unit 103 (S1403).

If it is determined at step S1302 that call status flag 140 is not "1" indicating the non-busy status, the calling program allocated to channel X is terminated (S1303). Then, the information of channel Y is obtained (S006), channel Y is activated, the channel information of the currently displayed channel of channel information management unit 105 is updated (S1304), and channel change is finished.

In the present embodiment, when there is a channel switching operation while the calling program is being executed, only the image is switched and audio communication is continued. Therefore, as in the second embodiment, even when channel is switched erroneously, the call is not interrupted and a smooth call can be realized.

<Fourth Embodiment>

Different from the first to third embodiments described above, an embodiment may be possible in which, when the channel switching operation is input to operation input unit 101 while the calling program is being executed, the image of audio/video input/output unit 103 is switched to the channel as changed and the call is continued on a sub-window combined to the main image. The fourth embodiment relates to such an operation.

Figure 23:
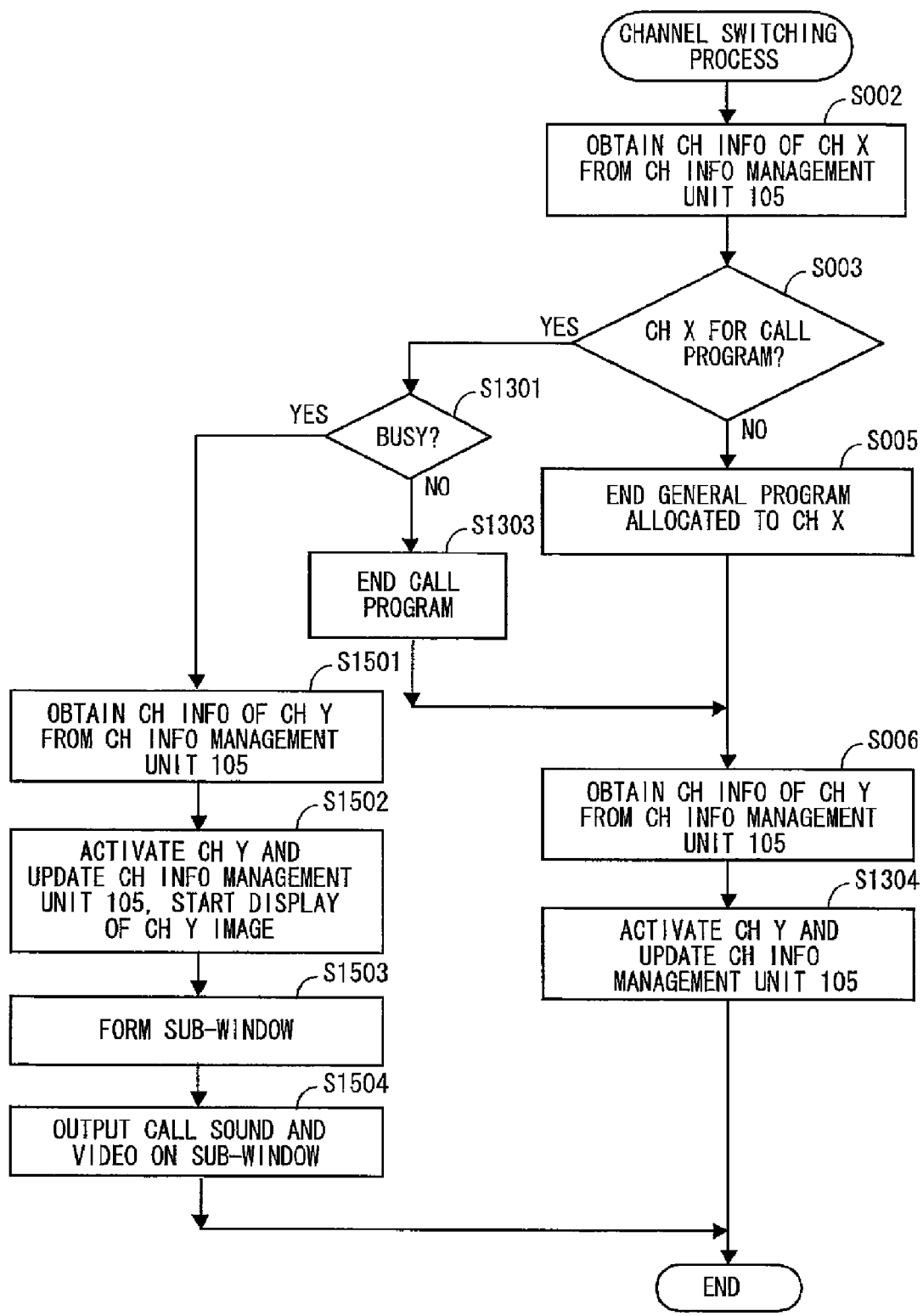
FIG. 23 is a flowchart representing a control structure of a program executed for continuing the call on a sub-window when a channel switching operation is done, in the TV with a calling function in accordance with a fourth embodiment of the present invention.

FIG. 23 is a flowchart representing the channel switching process in accordance with the fourth embodiment. When a channel switching operation is done through operation input unit 101 during a call and this process is performed in place of the channel switching process (step 156 of FIG. 6 and FIG. 7) of the first embodiment, the image is switched to the new channel and the call can be continued on the sub-window. In the following, an example of channel change from channel X to channel Y will be described.

Referring to FIG. 23, the process is activated when the channel switching operation is input to operation input unit 101 while the calling program is being executed.

The process steps S002 to S006 are the same as those shown in FIG. 7. It is noted, however, that in the fourth embodiment, if it is determined at step S003 that a calling program is allocated to channel X at present, whether the call status flag 140 of call status flag processing unit 107 has the value "1" indicating the busy status or not is determined (S1301).

If the call status flag 140 is "1" indicating the busy status, channel information of channel Y is obtained from channel information management unit 105 (S1501), channel Y is updated, channel information of the currently displayed channel is updated in channel information management unit 105, and image display of channel Y is started (S1502). Further, a sub-window is generated on the image display (S1503), and for the call that has been executed on channel X, of the sound and video image received by communication unit 104, the video image is output in a combined manner on the sub-window generated at step S1503 and the sound is output in the ordinary manner. Audio/video transmission from this side is continued (S1504).

If the call status flag 140 is not "1" indicating the busy status at step S1301, the calling program is terminated (S1303). Then, information of channel Y is obtained from channel information management unit 105 (S006), channel Y is activated and the channel information of the currently displayed channel is updated in channel information management unit 106 (S1304), whereby the channel change is finished.

In the fourth embodiment also, even when there is a channel switching operation during the call, the call can be continued using the sub-window. Even when the channel switching operation is done erroneously, the call is not interrupted, and a smooth call can be realized.

It is noted that TVs 1 and 2 with calling functions in accordance with the present invention can be realized by hardware having a configuration similar to that of a general computer and a program executed on the hardware. Though the hardware with channel interface is preferable, the channel interface may be implemented by software.

The program is stored in a computer readable recording medium, and various processes are realized by the CPU executing the above-described program. Examples of the recording medium include tapes such as magnetic tapes and cassette tapes, disks including magnetic disks such as flexible disk and hard disk, CD-ROM (Compact Disc Read-Only Memory), magneto-optical disk, mini-disk and DVD, cards such as IC (Integrated Circuit) cards and optical cards, and semiconductor memories such as mask ROM (Read-Only Memory), EEPROM (Electrically Erasable Programmable Read-Only Memory), flash PROM and flash ROM. Any of these media that fixedly carries the program can be used.

TVs with calling functions have been described as examples of the information-processing device having communication function. The present invention, however, is not limited to a TV with calling function for receiving TV broadcast, and it may be applied to any information-processing device that has a channel interface allowing selection of one channel from a plurality of channels, similar to the channel selector of the TV. By way of example, an information-processing device with a channel interface for receiving Internet broadcast (distribution) may be available.

Recently, there are also TVs with calling functions capable of displaying a plurality of image windows. In such a TV, an image for the call and the image of TV display can be given simultaneously. Therefore, it is possible to continue the call without performing such automatic processing described in connection with the first to fourth embodiments above.

In that case also, various processes for realizing smooth communication may be realized on the same principle as the automatic processing described above. By way of example, during the call, the channel switching of the image representing the communication may be invalidated. When one of the displayed image windows corresponds to the communication, sound volume of the channel or channels other than the communication may be reduced. Further, a speaker outputting TV sound and a speaker outputting the sound for the communication may be provided separately.

<Fifth Embodiment>

In the first to fourth embodiments, an integrated type TV with a calling function has been described as the information-processing device with a calling function. The information-processing device with a calling function need not be integrated hardware. A TV system 300 with calling function may be realized by providing an information-processing device like a TV and an audio/video input/output function and communication function for communication as separate devices that cooperate with each other. The communication function and the audio/video input/output function may be provided as separate devices.

Figure 24:
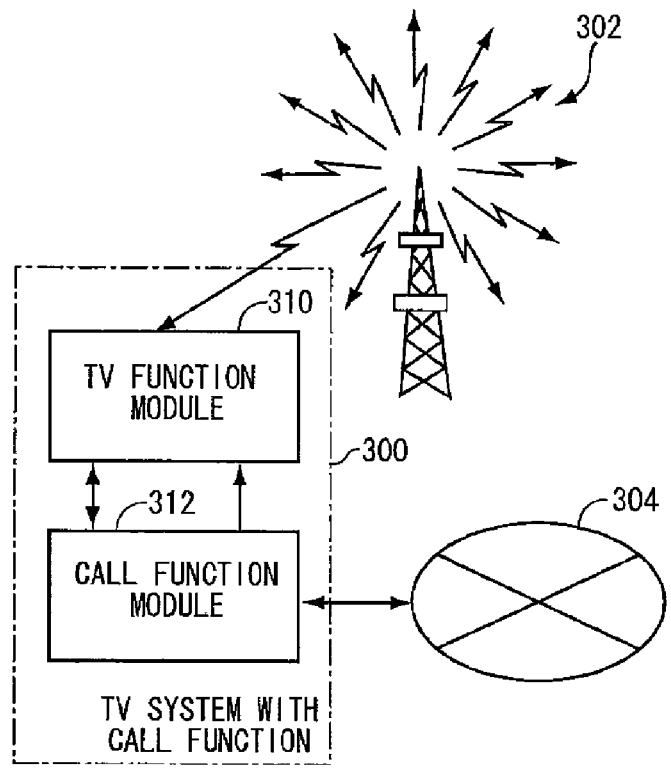
FIG. 24 is a schematic block diagram of a TV system 300 with a calling function in accordance with a fifth embodiment of the present invention.

FIG. 24 shows a schematic configuration of TV system 300 with calling function, as an example of the information processing system with a calling function in accordance with the fifth embodiment of the present invention. Referring to FIG. 24, TV system 300 with a calling function includes a TV function module 310 receiving radio waves from a broadcast station 302 and displaying a TV program, and a communication function module 312 connected to a public circuit or a network 304 and providing a function of communication to the other party by a telephone. TV function module 310 and calling function module 312 communicate control signals and video/audio signals as will be described later, and the TV system 300 with calling function consisting of the TV screen of TV function module 310 and the calling function of calling function module 312 can be realized by the cooperation of TV function module 310 and calling function module 312.

Figure 25:
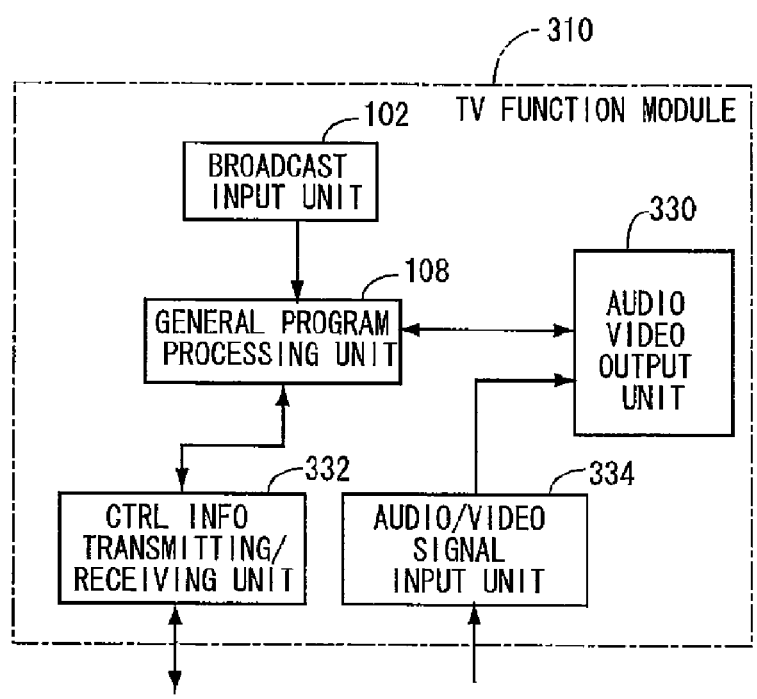
FIG. 25 is a block diagram of a TV function module 310 forming the TV system 300 with a calling function in accordance with a fifth embodiment.

FIG. 25 is a detailed functional block diagram of TV function module 310 shown in FIG. 24. Referring to FIG. 25, TV function module 310 includes broadcast input unit 102 and general program processing unit 108 of TV 1 with calling function shown in FIG. 2.

TV function module 310 further includes: an audio/video output unit 340 providing audio/video output at the time of displaying a TV program and at the time of a call through the telephone; a control information transmitting/receiving unit 332 for transmitting/receiving control signals to/from calling function module 312 for realizing the function of a TV with a calling function; and an audio/video signal input unit 334 for receiving image signals and audio signals from calling function module 312 and applying the signals to audio/video output unit 330 for output, at the time of a call through the telephone.

Figure 26:
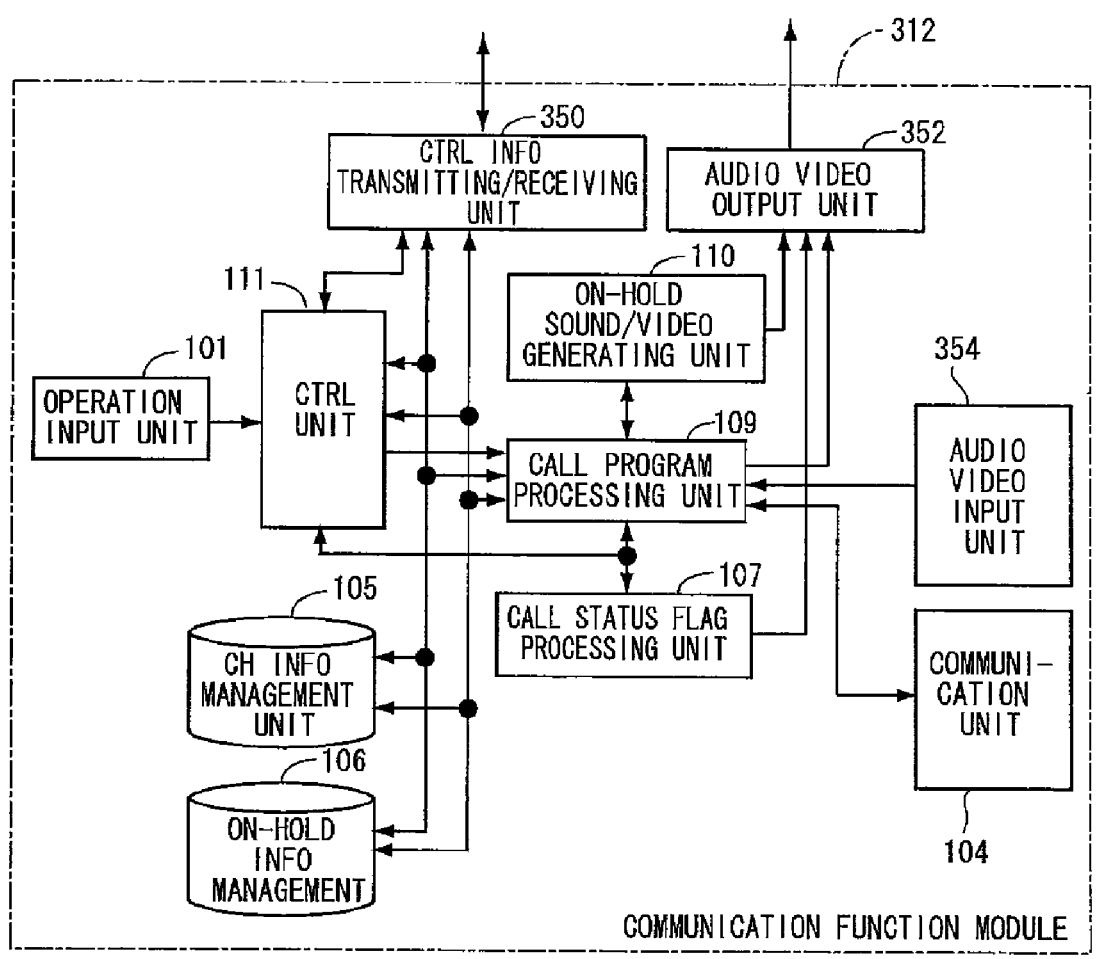
FIG. 26 is a block diagram of a calling function module 312 forming the TV system 300 with a calling function in accordance with a fifth embodiment.

FIG. 26 is a detailed functional block diagram of calling function module 312 shown in FIG. 24. Referring to FIG. 26, calling function module 312 includes operation input unit 101, control unit 222, channel information management unit 105, on-hold information management unit 106, on-hold sound/on-hold video generating unit 110, calling program processing unit 109, call status flag processing unit 017 and communication unit 104, which are the same as those shown in FIG. 2.

Calling function module 312 further includes: an audio video input unit 354 implemented by a microphone and a camera, for inputting one or both of sound and video and applying audio/video signal to calling program processing unit 109; a control information transmitting/receiving unit 350 for transmitting/receiving control information to/from control information transmitting/receiving unit 332 of TV function module 310; and an audio video output unit 352 for outputting the audio video signal processed by calling program processing unit 109 to audio/video input unit 334 of TV function module 310.

Control information transmitting/receiving unit 332 shown in FIG. 25 and control information transmitting/receiving unit 350 shown in FIG. 26 are for mediating exchange of control information, similar to the exchange to/from general program processing unit 108 and control unit 111, channel information management unit 105, on-hold information management unit 106, on-hold sound/on-hold video generating unit 110 and calling program processing unit shown in FIG. 2, to/from general program processing unit 108 shown in FIG. 25 and control unit 111, channel information management unit 105, on-hold information management unit 106, on-hold sound/on-hold video generating unit 110 and calling program processing unit 109 shown in FIG. 26.

Audio/video signal input unit 334 shown in FIG. 25 and audio/video output unit 352 shown in FIG. 26 are provided for performing the process similar to the audio and video transmission from calling program processing unit 109 and on-hold sound/on-hold video generating unit 110 to audio video input/output unit 103 shown in FIG. 2, which process is between on-hold sound/on-hold video generating unit 110 and calling program processing unit 109 shown in FIG. 6, and audio/video output unit 330 shown in FIG. 25. The audio/video signal applied from audio video output unit 352 through audio/video signal input unit 334 to audio/video output unit 330 may be any of the audio/video signal transmitted from the other party of the call through communication unit 104, the audio/video signal applied from audio video input unit 354, and the sound signal or on-hold image signal generated by on-hold sound/on-hold video generating unit 110.

Audio/video signal input unit 334 shown in FIG. 25 and audio/video output unit 352 shown in FIG. 26 typically correspond to audio/video input/output terminals of a TV and a video tape recorder. These are generally connected to each other by cables and the like.

TV system 300 with a calling function in accordance with the fifth embodiment operates in the similar manner as TV 1 with a calling function in accordance with the first embodiment shown in FIG. 2, except that the TV function and the calling function are divided to TV function module 310 and calling function module 312, respectively, and that control signals and audio/video signals are communicated therebetween through control information transmitting/receiving unit 332 and control information transmitting/receiving unit 350 and through audio/video signal input unit 334 and audio video output unit 352, for cooperation. Therefore, details of the operation of TV system 300 with a calling function will not be repeated.

When there is an operation input through operation input unit 101, control unit 311 of call module 312 applies a control instruction of channel change or the like through control information transmitting/receiving unit 350 shown in FIG. 26 and control information transmitting/receiving unit 332 shown in FIG. 25 to general program processing unit 108 of TV function module 310. General program processing unit 108 of TV function module 310 executes the received control instruction. Thus, channel switching, volume adjustment, power on and the like can be realized by an operation to calling function module 312, separate from the TV function module 310.

It is noted that calling function module 312 shown in FIG. 26 has audio video input unit 354. The present invention, however, is not limited to such an embodiment and, audio video input unit 354 may be provided as an audio video input device separate and independent from the body of calling function module 312, and the audio signal may be input through some interface to calling program processing unit 109.

<Modification>

In the first embodiment described above, when there is a channel switching operation while the calling program is being executed, the channel is switched with the call kept on-hold. In the second embodiment, when there is a channel switching operation while the calling program is being executed, the channel is switched if a call is not in progress, and the channel switching operation is discarded if a call is in progress. In the third embodiment, when there is a channel switching operation while the calling program is being executed, communication with voice is continued, and image display only is changed from the display of the call to the image of the changed channel.

The present invention, however, is applicable not only to such explicit channel switching operation but also forced channel change irrespective of user's intention. A possible example is reception of an emergency broadcast. When emergency broadcast is received, it is desirable to display the channel of emergency broadcast, no matter what channel is viewed at present. An example in which the present invention is applied to an information-processing device with a calling function supporting such a function will be described in the following. Though the configuration of the fifth embodiment is used as an example in the following, similar approach can be taken for the first to fourth embodiments.

Figure 27:
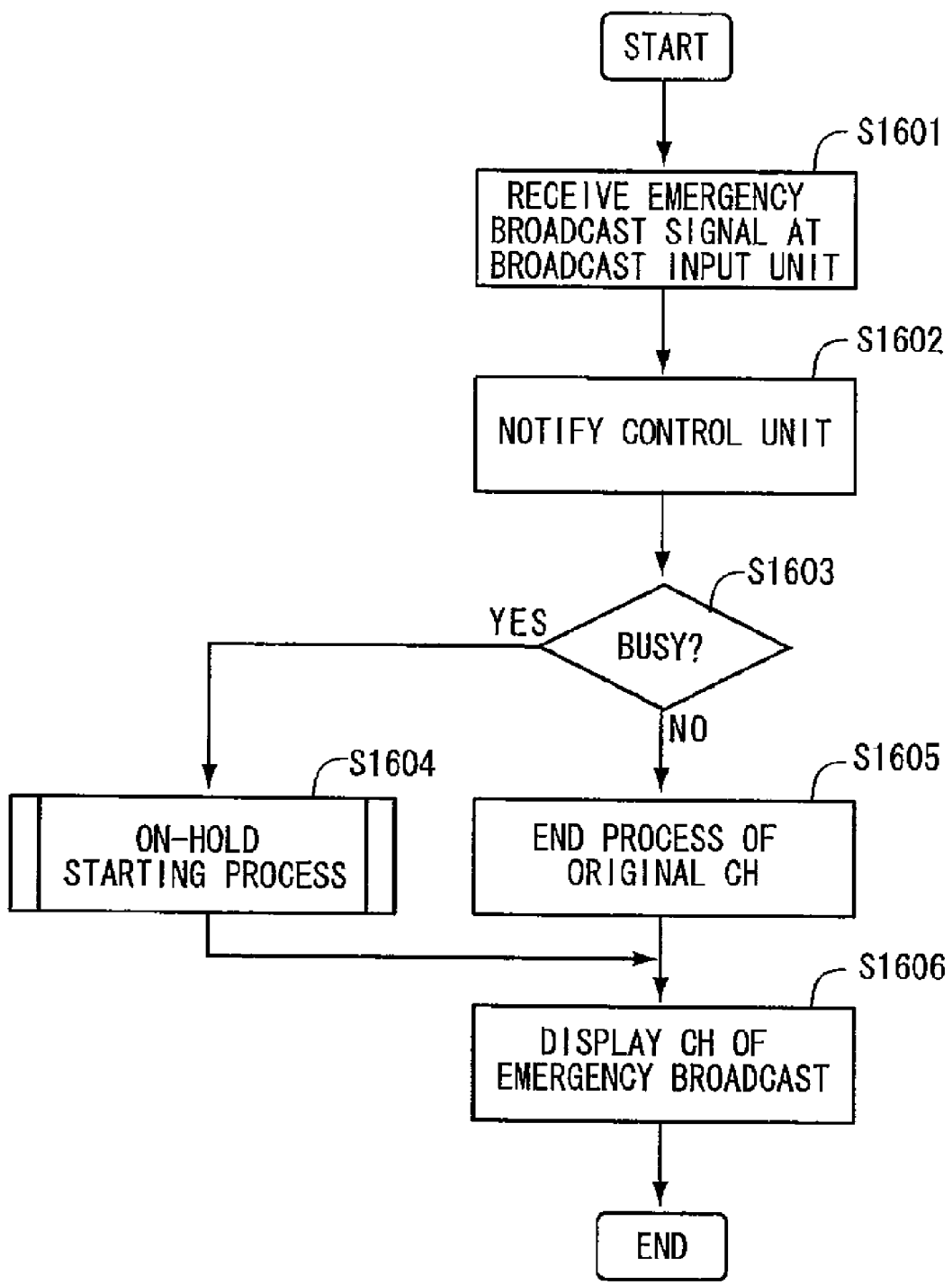
FIG. 27 is a flowchart representing the process flow when an emergency broadcast is received, in a modification of the TV system 300 with a calling function in accordance with a fifth embodiment.

In the following description, it is assumed that an emergency broadcast signal is input from broadcast input unit 102 shown in FIG. 25. The process here is as shown in FIG. 27. Referring to FIG. 27, when the emergency broadcast signal is input from broadcast input unit 102 (S1601), general program processing unit 108 notifies the control unit 111 of the input of emergency broadcast signal (S1602). Control unit 111 determines whether a call is in progress or not (S1603), and if the call is in progress, places the call on hold (S1604). If a call is not in progress, control unit 111 terminates the process of currently displayed channel (S1605). After the end of the process of step S1604 or S1065, control unit 111 transmits a control signal instructing display of the emergency broadcast channel, to general program processing unit 108. In response to the control signal, general program processing unit 108 displays the channel of emergency broadcast, on audio/video output unit 330 (S1606).

By such a process, when an emergency broadcast is received during the call using TV function module 310 and calling function module 312, the emergency broadcast is displayed with the call kept on-hold. Therefore, the caller can immediately know the contents of the emergency broadcast. Further, the call is automatically set on-hold, and hence, abrupt termination of the call is prevented. Connection to the other party of the call is still maintained. Therefore, when the emergency broadcast ends, the call can be resumed simply by canceling the on-hold status without the necessity of making a new call.

The method of addressing the emergency broadcast is not limited to this method. When a call is in progress, the emergency broadcast may be received while continuing the call, without setting the call on-hold. Alternatively, the image for call and the image for emergency broadcast may be displayed in combination.

When the call is automatically set on-hold, a message may be sent to the other party of the call that the on-hold status started automatically because of the emergency broadcast. The call may be disconnected when the emergency broadcast is received, and a display may be given indicating that the communication is disconnected because of the emergency broadcast.

The on-hold status may be automatically cancelled at the end of emergency broadcast. If the channel that was viewed at the time of reception of the emergency broadcast is a general program, the channel may be displayed at the end of the emergency broadcast.

As to the reception of emergency broadcast, it may be input not through broadcast input unit 102 but through communication unit 104.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

Industrial Applicability

The present invention may be utilized for a multi-functional TV receiver, a home-use telephone, and a set top box for a TV.

The invention claimed is:

1. An information-processing device with a calling function, cooperating with an information output device including channel selecting means capable of selecting one of a plurality of channels each serving as a source for providing one or both of image and sound and output means for outputting one or both of the image and sound from the channel selected by said channel selecting means, comprising:
communication means for communicating with other equipment through a communication network;
calling application executing means for executing a calling application allowing a call with other user by one or both of image and sound, by cooperation with said information output device, through said communication means, when a predetermined first channel is selected by said channel selecting means;

determining means for determining whether a call by said calling application is in progress or not, referred to by said calling application executing means when executing said calling application; and process selecting means, responsive to an operation requesting channel switching from said first channel to a second channel by said channel selecting means, for executing one of a predetermined plurality of processes, depending on a result of determination by said determining means; wherein said process selecting means includes call continuing means for continuing a call by said calling application on said first channel, when the result of determination by said determining means indicates that the call by said calling application is in progress.

2. An information-processing device with a calling function, cooperating with an information output device including channel selecting means capable of selecting one of a plurality of channels each serving as a source for providing one or both of image and sound and output means for outputting one or both of the image and sound from the channel selected by said channel selecting means, comprising:

communication means for communicating with other equipment through a communication network;

calling application executing means for executing a calling application allowing a call with other user by one or both of image and sound, by cooperation with said information output device, through said communication means, when a predetermined first channel is selected by said channel selecting means;

determining means for determining whether a call by said calling application is in progress or not, referred to by said calling application executing means when executing said calling application; and process selecting means, responsive to an operation requesting channel switching from said first channel to a second channel by said channel selecting means, for executing one of a predetermined plurality of processes, depending on a result of determination by said determining means; wherein said process selecting means includes call continuing means for continuing execution of said calling application on said first channel and for starting a program allocated to said second channel, when the result of determination by said determining means indicates that the call by said calling application is in progress.

3. The information-processing device with a calling function according to claim 2, wherein said communication means is capable of video communication; and said call continuing means includes means for continuing an audio call by said calling application while interrupting image communication, and means for starting image display by a program allocated to said second channel.

4. The information-processing device with a calling function according to claim 3, wherein said communication means is capable of video communication; and said call continuing means includes means for continuing an audio call by said calling application, and means for presenting image display combining an image of the program allocated to said second channel and an image by said calling application.

5. An information-processing device with a calling function, cooperating with an information output device including channel selecting means capable of selecting one of a plurality of channels each serving as a source for providing one or both of image and sound and output means for outputting one or both of the image and sound from the channel selected by said channel selecting means, comprising:

communication means for communicating with other equipment through a communication network;

calling application executing means for executing a calling application allowing a call with other user by one or both of image and sound, by cooperation with said information output device, through said communication means, when a predetermined first channel is selected by said channel selecting means;

determining means for determining whether a call by said calling application is in progress or not, referred to by said calling application executing means when executing said calling application;

process selecting means, responsive to an operation requesting channel switching from said first channel to a second channel by said channel selecting means, for executing one of a predetermined plurality of processes, depending on a result of determination by said determining means; and storage means for storing prescribed information related to a calling program, related to execution of said calling application, referred to by said determining means when executing the calling application.

6. The information-processing device with a calling function according to claim 5, wherein said information related to a calling program includes on-hold party information identifying a party of a call when the call by said calling program is kept on-hold; and said process selecting means includes means for suspending a call by said calling application of said first channel and starting execution of the application allocated to said second channel, when the result of determination by said determining means indicates that the call by said calling application is in progress, and means for setting information identifying the other party of the call through said first channel, in said on-hold party information.

7. The information-processing device with a calling function according to claim 6, further comprising call resuming means, responsive to an operation requesting channel switching to said first channel by said channel selecting means and responsive to an indication by the result of determination of said determining means that a call is not in progress, for resuming the call by said calling program to the other party of the call identified by said on-hold party information, using said first channel.

8. The information-processing device with a calling function according to claim 6, wherein said process selecting means further includes on-hold notifying means responsive to suspension of the call by said calling application, for sending an on-hold notifying signal requesting on-hold of a call by said calling application, to the other party of the call of said calling application.

9. The information-processing device with a calling function according to claim 6, further comprising:

a timer measuring a constant time period from setting of said on-hold party information;

means, responsive to clearing of said on-hold party information, for resetting said timer;

means, responsive to expiration of time measurement of said constant time period by said timer, for transmitting a disconnection request of the call by said calling application, to the other party of the call indicated by said on-hold party information; and means for clearing said on-hold party information, based on transmission of said disconnection request.

10. The information-processing device with a calling function according to claim 5, wherein said information related to a calling program includes on-hold requesting party information identifying a transmission source that transmitted on-hold request requesting on-hold of a call through said communication means;

said information-processing device with a calling function further comprising:

call suspending means, responsive to reception of the on-hold request from the other party of the call through said communication means during a call using said calling application on said first channel, for suspending the call by said calling application;

means for storing, in said storage means, information identifying the other party of the call that transmitted said on-hold request, as said on-hold requesting party information, based on suspension of the call by said calling application; and call resuming means, responsive to said communication means receiving an on-hold canceling request, for comparing the transmission source of the on-hold canceling request and said on-hold requesting party information, and for resuming execution of said calling application when they match.

11. The information-processing device with a calling function according to claim 10, further comprising means, responsive to resuming of the call by said call resuming means, for clearing said on-hold requesting party information.

12. The information-processing device with a calling function according to claim 10, further comprising means for executing a channel switching process to said first channel without changing said on-hold requesting party information, when an operation requesting channel switching to said first channel is made by said channel selecting means while the result of determination by said determining means indicates that a call is not in progress and said on-hold requesting party information is not cleared.

13. The information-processing device with a calling function according to claim 1, further comprising said information output device.

14. A computer program causing, when executed by a computer with a communication device, said computer to operate as the information-processing device with a calling function according to claim 1.

15. A method of executing an application in an information-processing device with a calling function, cooperating with an information output device including channel selecting means capable of selecting one of a plurality of channels each serving as a source for providing one or both of image and sound and output means for outputting one or both of the image and sound from the channel selected by said channel selecting means; wherein said information-processing device with a calling function includes communication means for communicating with other equipment through a communication network, and prescribed applications are allocated to said plurality of channels, respectively;

said method comprising the steps of:

detecting said channel selecting means performing an operation requesting switching to a predetermined first channel;

executing, in response to detection of the operation requesting switching to said first channel, a calling application allowing a call with other user by one or both of image and sound, by cooperation with said information output device, through said communication means; and the first determining step of determining prescribed condition related to execution of said calling application, when executing said calling application; wherein said executing step includes the step of activating, in response to detection of the operation requesting switching to said first channel, said calling application with reference to a result of determination of said first determining step;

said first determining step includes the step of determining, when said calling application is to be executed, whether a call by said calling application is in progress or not;

said method further comprising the process selecting step, responsive to said channel selecting means performing an operation requesting channel switching from said first channel to said second channel, of executing one of a predetermined plurality of processes, depending on a result of determination of call status by said determining step; wherein said process selecting step includes the step of continuing the call by said calling application of said first channel and suspending execution of an application allocated to said second channel, when the result of determination of said determining step indicates that a call by said calling application is in progress.

16. A method of executing an application in an information-processing device with a calling function, cooperating with an information output device including channel selecting means capable of selecting one of a plurality of channels each serving as a source for providing one or both of image and sound and output means for outputting one or both of the image and sound from the channel selected by said channel selecting means; wherein said information-processing device with a calling function includes communication means for communicating with other equipment through a communication network, and prescribed applications are allocated to said plurality of channels, respectively;

said method comprising the steps of detecting said channel selecting means performing an operation requesting switching to a predetermined first channel;

executing, in response to detection of the operation requesting switching to said first channel, a calling application allowing a call with other user by one or both of image and sound, by cooperation with said information output device, through said communication means; and the first determining step of determining a prescribed condition related to execution of said calling application, when executing said calling application; wherein said executing step includes the step of activating, in response to detection of the operation requesting switching to said first channel, said calling application with reference to a result of determination of said first determining step;

said first determining step includes the step of determining, when said calling application is to be executed, whether a call by said calling application is in progress or not;

said method further comprising the process selecting step, responsive to said channel selecting means performing an operation requesting channel switching from said first channel to said second channel, of executing one of a predetermined plurality of processes, depending on a result of determination of call status by said determining step; wherein said process selecting step includes the step of suspending the call by said calling application on said first channel, when the result of determination of said determining step indicates that a call by said calling application is in progress, and the step of starting an application allocated to said second channel, regardless of the result of determination of said determining step.

17. The method according to claim 16, wherein said information-processing device with a calling function further includes storage means for storing prescribed information related to a calling program related to execution of said calling application; and said process selecting step further includes the step of storing, in said storage means, information identifying a party of a call by said calling application, in response to suspension of the call by said calling application at said suspending step.

18. The method according to claim 17, further comprising:

the second determining step of determining whether a call by said calling application is in progress or not, in response to said channel selecting means performing the operation requesting channel switching to said first channel;

the third step of determining whether said information of the other party of the call is stored in said storage means or not, in response to determination at said second determining step that a call is not in progress; and the step of resuming the call with the other party of the call specified by said information of the other party of the call by said calling application using said first channel, in response to the determination at said third step that said information of the other party of the call is stored in said storage means.

19. The method according to claim 18, further comprising the step of clearing information stored in said storage means, in response either to resuming of the call by said calling application at said resuming step or to termination of execution of said calling application.

20. The method according to claim 18, further comprising:

the step of suspending a call by said calling application, in response to reception of an on-hold request from the other party of the call through said communication means during a call using said calling application on said first channel;

the step of storing information of the other party of the call that transmitted said on-hold request, based on suspension of the call by said calling application; and the step of comparing, responsive to reception of an on-hold canceling request by said communication means, transmission source of the on-hold canceling request with said information of the other party of the call, and resuming execution of said calling application when they match.

21. The method according to claim 20, further comprising the step of clearing the information stored in said storage means, in response either to resuming of execution of said calling application at said execution resuming step, or to termination of execution of said calling application.

22. The method according to claim 15, wherein said information-processing device with a calling function further includes storage means for storing prescribed information related to a calling program, related to execution of said calling application, referred to when said calling application is to be executed; and said executing step includes the step of activating said calling application with reference to said program related information, in response to detection of an operation requesting switching to said first channel.

23. A computer program controlling, when executed by a computer, the computer such that all the steps recited in claim 15 are executed.

24. A computer readable recording medium, recording the computer program according to claim 14.

25. An information-processing device with a calling function, cooperating with an information output device including channel selecting means capable of selecting one of a plurality of channels each serving as a source for providing one or both of image and sound and output means for outputting one or both of the image and sound from the channel selected by said channel selecting means, comprising:

communication means for communicating with other equipment through a communication network;

calling application executing means for executing a calling application allowing a call with other user by one or both of image and sound, by cooperation with said information output device, through said communication means, when a predetermined first channel is selected by said channel selecting means;

determining means for determining whether a call by said calling application is in progress or not, referred to by said calling application executing means when executing said calling application; and process selecting means, responsive to an operation requesting channel switching from said first channel to a second channel by said channel selecting means, for executing one of a predetermined plurality of processes, depending on a result of determination by said determining means; wherein a plurality of said first channels are provided and each allocated to an other device with which said communication means communicates.

* * * * *